United States Patent
Oberpriller et al.

(10) Patent No.: US 11,639,266 B2
(45) Date of Patent: May 2, 2023

(54) GOODS TO OPERATOR WORKSTATION

(71) Applicant: INTELLIGRATED HEADQUARTERS, LLC, Mason, OH (US)

(72) Inventors: Mark Lee Oberpriller, Atlanta, GA (US); Anthony James Turco, Liberty Township, OH (US); Jari Nicholas Sebastian, Trenton, OH (US); Michael James Wells, Lake Stevens, WA (US); Richard Graff, Cincinnati, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 106 days.

(21) Appl. No.: 17/249,710

(22) Filed: Mar. 10, 2021

(65) Prior Publication Data

US 2022/0289484 A1 Sep. 15, 2022

(51) Int. Cl.
*B65G 1/137* (2006.01)
*B65G 47/57* (2006.01)
(Continued)

(52) U.S. Cl.
CPC ............ *B65G 1/1373* (2013.01); *B65G 13/02* (2013.01); *B65G 47/57* (2013.01); *G01S 17/06* (2013.01); *G01S 17/89* (2013.01)

(58) Field of Classification Search
CPC ............ B65G 13/02; B65G 2201/0225; B65G 47/57; B65G 1/1373; G01S 7/4817; G01S 17/06; G01S 17/89
See application file for complete search history.

(56) References Cited

U.S. PATENT DOCUMENTS

2016/0031644 A1* 2/2016 Schubilske .......... B65G 1/1376
   700/216
2017/0362039 A1* 12/2017 Eisenberg ............ B65G 47/643
(Continued)

FOREIGN PATENT DOCUMENTS

CN   304670185    6/2018
CN   305297059    8/2019
(Continued)

OTHER PUBLICATIONS

Inther Group. (Oct. 31, 2019). GTP—Goods to Person [Video]. YouTube. https://www.youtube.com/watch?v=uYytfvL9d9M.
(Continued)

*Primary Examiner* — James R Bidwell
(74) *Attorney, Agent, or Firm* — Alston & Bird LLP

(57) ABSTRACT

In various embodiments, a goods to operator workstation is provided. The goods to operator workstation include an upper level. The upper level includes an upper level conveyor and one or more upper level container bays configured to receive and present one of the one or more upper level containers. The goods to operator workstation also includes at least one connector panel extending from the upper level. The goods to operator workstation further includes a lower level coupled to the at least one connector panel. The lower level is configured to receive one or more lower level containers. A gap is defined between the upper level and lower level that is sized to allow the one or more lower containers to be placed on the lower level. A method of operating the goods to operator workstation is also included.

28 Claims, 21 Drawing Sheets

(51) Int. Cl.
*B65G 13/02* (2006.01)
*G01S 17/89* (2020.01)
*G01S 17/06* (2006.01)

(56) References Cited

U.S. PATENT DOCUMENTS

| | | |
|---|---|---|
| 2018/0305123 A1 | 10/2018 | Lert, Jr. et al. |
| 2020/0065745 A1* | 2/2020 | Engel .................... G06Q 10/087 |
| 2022/0113384 A1* | 4/2022 | Joseph ................ G06Q 10/0875 |

FOREIGN PATENT DOCUMENTS

| | | | | |
|---|---|---|---|---|
| CN | 111731809 A | | 10/2020 | |
| DE | 10136354 A1 | | 2/2003 | |
| DE | 102008012877 A1 | | 9/2009 | |
| DE | 102010010305 A1 | | 9/2011 | |
| DE | 202017102428 | * | 7/2018 | ............. B65G 47/57 |
| DE | 102019119804 | * | 7/2019 | ............. B65G 47/52 |
| EP | 3409621 | * | 12/2018 | ............. B65G 29/02 |
| IL | 59154 | | 9/2016 | |
| JP | 2007-153490 A | | 6/2007 | |
| JP | 1649201 | | 12/2019 | |
| KR | 101795440 | * | 11/2017 | ............. B65G 43/08 |
| KR | 20210155120 | * | 12/2021 | ............. B65G 13/02 |
| KR | 102367964 | * | 2/2022 | ........... B65G 1/1378 |
| WO | D211276-003 | | 6/2020 | |

OTHER PUBLICATIONS

European Search Report and Search Opinion received for EP Application No. 22158388.3, dated Jul. 15, 2022, 8 pages.

\* cited by examiner

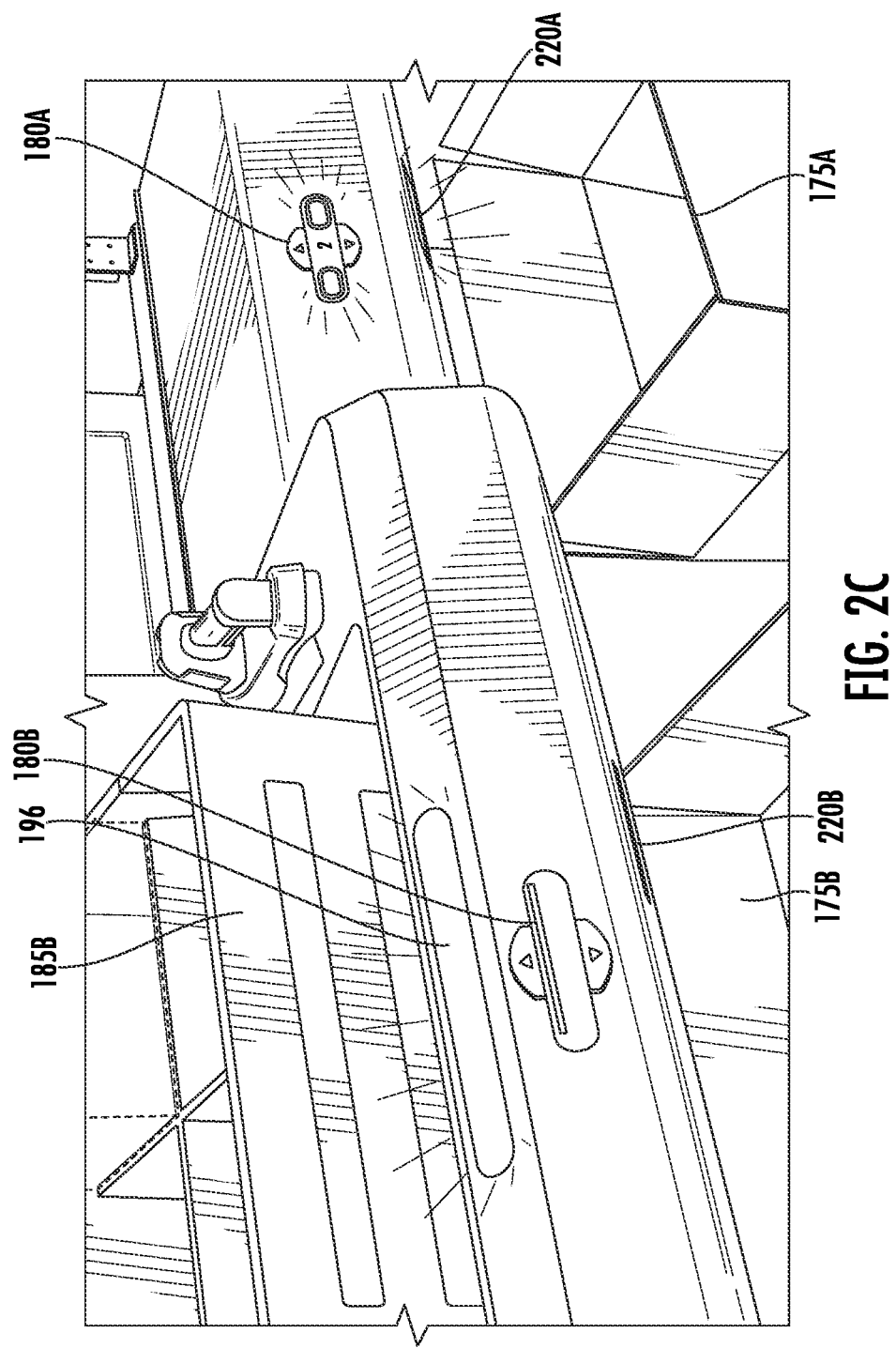

GOODS TO OPERATOR WORKSTATION

TECHNOLOGICAL FIELD

Example embodiments of the present invention relate generally to a material handling system, and more particularly, to a workstation for delivering goods to an operator for handling.

BACKGROUND

Picking or workstations are essential components of high volume distribution and fulfillment operations. Conventionally, order picking requires an order picker to take an order list, walk through racks of products filled with containers of products to pick from, picking the listed products from product containers, and placing the picked products into an order container for delivery to packaging. However, this solution is, in some examples, slow and requires additional employees.

Applicant has identified several technical challenges associated with order picking and other associated systems and methods. Through applied effort, ingenuity, and innovation, many of these identified challenges have been overcome by developing solutions that are included in embodiments of the present invention, many examples of which are described in detail herein.

SUMMARY

The following presents a simplified summary to provide a basic understanding of some aspects of the disclosed goods to operator workstation. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a goods to operator workstation is provided. The goods to operator workstation include an upper level. The upper level includes an upper level conveyor and one or more upper level container bays configured to receive and present one of the one or more upper level containers. The goods to operator workstation also includes at least one connector panel extending from the upper level. The goods to operator workstation further includes a lower level coupled to the at least one connector panel. The lower level is configured to receive one or more lower level containers. A gap is defined between the upper level and lower level that is sized to allow the one or more lower containers to be placed on the lower level.

In some embodiments, each of the one or more upper level container bays include an upper level bay conveyor to retrieve and provide the given upper level container to and from an upper level conveyor. In some embodiments, each of the one or more upper level container bays is angled downwardly away from the upper level conveyor, such that during operation, the upper level container in the given upper level container bay is angled toward an operator.

In some embodiments, the lower level includes one or more lower level container bays to receive and present one of the one or more lower level containers. In some embodiments, each of the one or more lower level container bays include a lower level bay conveyor to provide the given lower level container to a lower level conveyor. In some embodiments, each of the one or more lower level container bays is angled downwardly away from the lower level conveyor, such that during operation, the lower level container in the given lower level container bay is angled toward the operator.

In some embodiments, the goods to operator workstation may also include an overhead mount arcuately extending above the upper level. In some embodiments, the overhead mount includes an integrated display configured to provide picking operation information to the operator during operation. In some embodiments, one overhead mount is provided for a plurality of upper level container bays within the upper level of the goods to operator workstation. In some embodiments, the overhead mount includes a projection indicator configured to illuminate at least a portion of an upper level container for which the operator is to retrieve one or more objects.

In some embodiments, the goods to operator workstation also includes an object selection indicator configured to indicate an instance in which an object should be disposed in a given lower level container. In some embodiments, the object selection indicator includes an engagement mechanism configured for the operator to engage in an instance in which an object is disposed in the corresponding lower level container. In some embodiments, the object selection indicator includes a light configured to illuminate the given lower level container.

In another example embodiment, a goods to operator workstation is provided. The goods to operator workstation includes an upper level. The upper level includes an upper level conveyor and one or more upper level container bays configured to receive and present one of the one or more upper level containers. The goods to operator workstation also includes at least one connector panel extending from the upper level. The goods to operator workstation further includes a lower level coupled to the at least one connector panel. The lower level configured to receive one or more lower level containers. A gap is defined between the upper level and lower level that is sized to allow the one or more lower containers to be placed on the lower level. The goods to operator workstation still further includes a first sidecar coupler defined along a first lateral side of the goods to operator workstation configured to couple the goods to work workstation to a modular sidecar.

In some embodiments, the modular sidecar is a second goods to operation workstation. In some embodiments, the modular sidecar includes an additional lower level container bay. In some embodiments, the modular sidecar includes an object selection indicator configured to illuminate the given additional lower level container bay in an instance in which objects are to be disposed.

In some embodiments, the goods to operator workstation and the modular sidecar are coupled electrically. In some embodiments, the goods to operator workstation and the modular sidecar are coupled mechanically. In some embodiments, the goods to operator workstation further includes a second coupler defined along a second lateral side of the goods to operator workstation opposite the first lateral side.

In still another example embodiment, a goods to operator workstation is provided. The goods to operator workstation includes an upper level. The upper level includes an upper level conveyor and one or more upper level container bays configured to receive and present one of the one or more upper level containers. The goods to operator workstation also includes at least one connector panel extending from the upper level. The goods to operator workstation further includes a lower level coupled to the at least one connector panel. The lower level is configured to receive one or more lower level containers. A gap is defined between the upper level and lower level that is sized to allow the one or more lower containers to be placed on the lower level. The goods to operator workstation still further includes a platform configured to allow the operator to stand on during operation of the goods to operator workstation.

In some embodiments, the platform is defined along a length direction of the lower level. In some embodiments, a height of the platform is based on the size of the lower level container to be used in the goods to operator workstation. In some embodiments, the platform is retractable or moveable.

In yet another example embodiment, a method of operating the goods to operator workstation is provided. The method includes identifying an upper container disposed in one of one or more upper level container bay from which to retrieve one or more objects. The method also includes providing an indication of the upper container from which to retrieve the one or more objects. The method further includes determining one or more lower level containers to dispose the one or more retrieved objects. The method still further includes receiving a complete indication for one of the one or more lower level containers that the objects intended to be disposed in the given lower level container has been disposed.

In some embodiments, the method also includes confirming the placement of the one or more objects into the correct lower level container. In some embodiments, the method also includes causing the lower level container to be removed from the given lower level container upon receiving the complete indication. In some embodiments, the method also includes causing an indication to an operator that a lower level container bay is empty. In some embodiments, the method also includes causing the upper level container to be removed from the given upper level container bay once the one or more objects are retrieved.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 2A-2D illustrate various views of a goods to operator workstation in accordance with a second embodiment of the present disclosure;

DETAILED DESCRIPTION

Figure 1A:
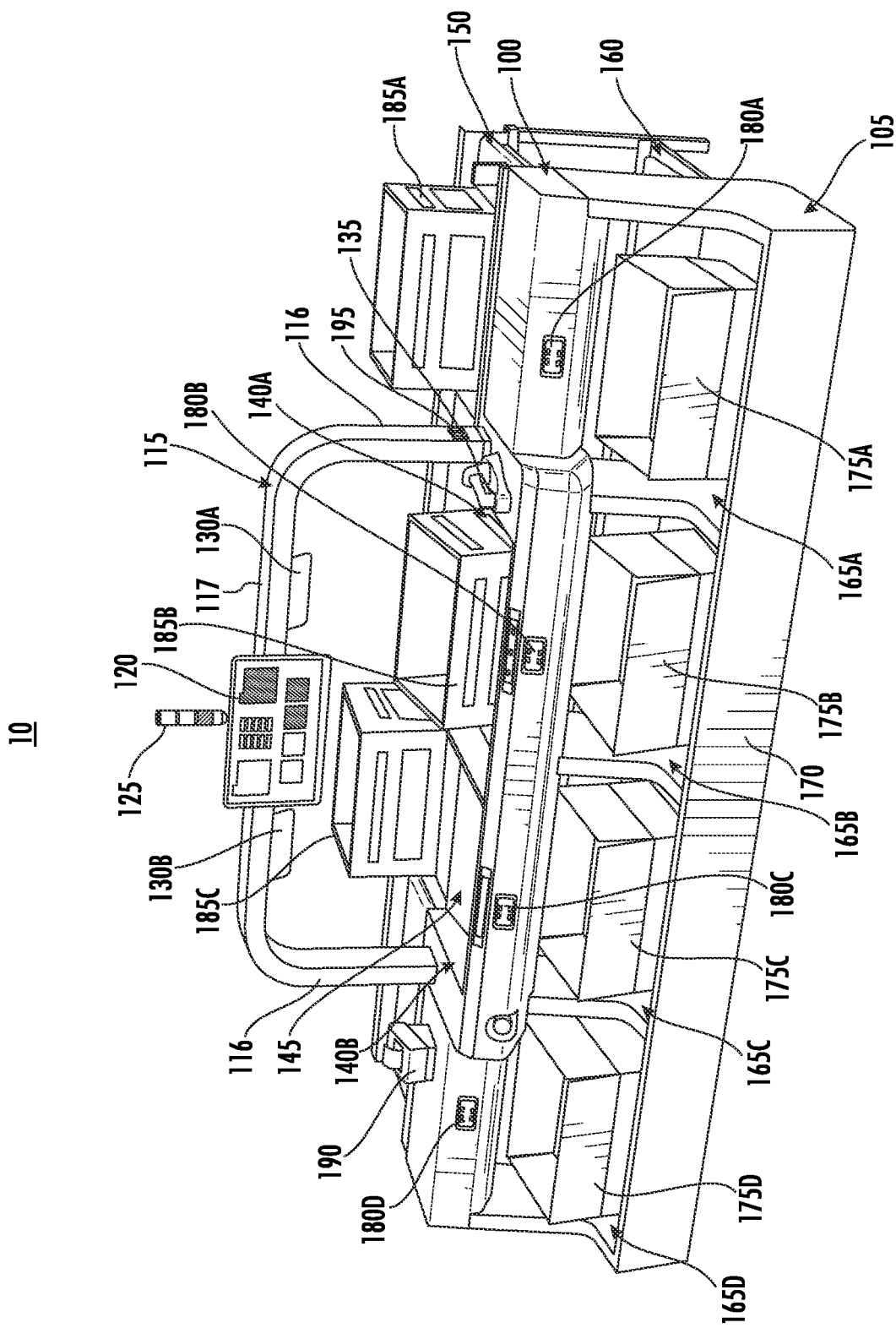
FIGS. 1A-1D illustrate various views of a goods to operator workstation in accordance with a first embodiment of the present disclosure.

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the invention described herein such that embodiments may include fewer or more components than those shown in the figures while not departing from the scope of the invention. Various embodiments shown and discussed herein may include different features, such features may be used interchangeably in various other embodiments unless explicitly stated otherwise.

In some examples, historical order picking solutions required an order picker to take an order list, walk through racks of products filled with containers of products to pick from, pick the listed products from product containers, and place the picked products into an order container for delivery to packaging. Such solutions could be effective, but they were overly time consuming and were fraught with errors. In response, example automated solutions can reduce time, number of employees, injuries, and costs. An automated system can, in some examples, facilitate the delivery of product containers to the picker for picking, return the product containers to storage, and deliver the filled orders to packing and shipping. Indeed, in some examples, automated systems are configured to rely on conveyor systems to deliver a product to an area or workstation.

Examples of such automated systems, in the form of a goods to operator workstation, are disclosed herein. The goods to operator workstation described herein, in accordance with one or more embodiments of the present disclosure, may be attachable or be positioned next to an infeed conveyor and a discharge conveyor of a material handling system that is configured for automatically presenting infeed containers to an operator for goods handling and for automatically taking away handled container to the discharge conveyor. Thus, the goods and/or the containers are easily accessible to the operator at an order picking position without the need for the operator to walk through the aisles or to manually move containers on the conveyors.

Various embodiments herein include a goods to operator (GTO) workstation designed for increased usability and functionality. The GTO workstation of various embodiments may allow for a single operator to move objects from one container (e.g., a reusable tote) and place them into one or more other containers (e.g., a corrugated cardboard box) using a multiple level GTO workstation that allows for accessibility for the operator to transfer the objects. During operation, the GTO is designed with a gap between the upper level and lower level that is sufficiently large to receive the lower level container (e.g., a corrugated cardboard box) into the lower level but sufficiently small so as to allow for a user to access the upper level container. The gap between the upper level and lower level allows for the operator to place the container into the lower level instead of having to assembly and/or place the containers on a conveyor elsewhere to be provided to the lower level. Various components discussed herein allow for increased adjustability to account for different types and sizes of boxes during operation.

An example goods to operator workstation may be used to retrieve goods from a warehouse or storage area and move them into separate containers or totes to be transported (e.g., to a customer). During operation, the upper level conveyor may provide upper level containers to a given upper level container bay to allow the operator to remove one or more objects in the upper level container and place said objects into one or more lower level containers. The GTO workstation 10 is configured to indicate to the operator which objects are to be retrieved and into which lower level container to place said objects. Upon retrieval and proper placement, the given upper level containers and lower level containers are removed via the respective upper level conveyor and lower level conveyor.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details.

FIG. 1 illustrates a view of an example goods to operator (GTO) workstation 10, in accordance with one or more embodiments of the present disclosure. The GTO workstation 10 may include an upper level 100 and a lower level 105 that are connected via level connector panels 102. In some examples, the upper level 100 is configured to receive one or more containers or totes having one or more items. These items, may take the form of one or more products, goods, stock keeping units, and/or the like. The lower level may facilitate one or more containers, such as shipping boxes. In this way, said shipping boxes may be configured to receive the one or more items and, in an instance in which the shipment is complete, be sent away via one or more conveyors to be shipped to a customer. The various operations of the GTO workstation may be carried out via a processing circuitry (e.g., the processing circuitry 500 shown in FIG. 5). The GTO workstation 10 may include one or more controller 513 that carry out one or more of the operations discussed herein.

The upper level 100 may include an upper level conveyor 150 and one or more upper level container bays 140A, 140B.

The upper level conveyor 150 may be attachable to or located adjacent to an infeed conveyor (e.g., the infeed conveyor may be connected to the upper level conveyor 150, such that the infeed conveyor may provide one or more upper level containers 185A, 185B, 185C to the upper level conveyor 150, which then may deliver the given upper level container to one of the upper level container bays 140A, 140B). Such an infeed container may urge the one or more totes onto the upper level conveyor 150.

In some examples, the one or more container bays 140A, 140B are positioned on a front or user side of the device, while the upper level conveyor 150 may be located on an opposite side from the user. In this way, containers travel along upper level conveyor 150 and, in an instance which they are to be handled by the user, selectively deposited or otherwise placed in the one or more upper level container bays 140A, 140B.

In various embodiments, the upper level container 185A-C may be a tote or other style container that is retrieved from within a warehouse or storage area. For example, the upper level container 185A-C may take the form of totes (e.g., made out of plastic, composite, and/or the like), that includes one or more items from which the operator will distribute to one or more lower level containers 175A-175D. Discussed in more detail below, the lower level containers 175A-175D may include individual containers for shipping or the like (e.g., made out of cardboard and/or the like). While shown as different types of containers, the upper level containers 185A-C and the lower level containers 175A-175D may be the same type of containers (e.g., the goods to operator "GTO" Workstation 10 could be used to reorganize reusable totes or transfer a box of a given objects in a corrugated cardboard box into another type of container). As such, the upper level containers 185A-C and the lower level containers could each be any one of various types of containers.

The upper level 100 may have one or more upper level container bays 140A, 140B. While the examples shown in the figures include a first upper level container bay 140A and a second upper level container bay 140B, additional or fewer container bays may be provided. In various embodiments, the number of upper level container bay 140A, 140B on the GTO workstation 10 may be based on the intended number of operators on a given GTO workstation 10. For example, a GTO workstation 10 may include a first upper level container bay 140A and a second upper level container bay 140B intended to be serviced by a single operator (e.g., an operator may retrieve objects out of one of the upper level containers (e.g., 185A) in one of the upper level container bay, while a new container is being retrieved for the other upper level container bay).

In various embodiments, each of the upper level container bays 140A, 140B may each have an upper level bay conveyor 145 configured to retrieve and/or otherwise urge a given upper level container into a given upper level container bay 140A, 140B. For example, each given upper level bay conveyor 145 may be connected to the upper level conveyor 150, such that an upper level container 185A-C is urged into the given upper level container bay 140A, 140B. The upper level bay conveyor 145 and/or the upper level conveyor 150 may each be one or more full width belt (FWB) conveyor (e.g., a motor driven roller (MDR) may be provided under the belt to drive the FWB. Alternatively or additionally, the upper level bay conveyor 145 and/or the upper level conveyor 150 may have rollers (automated and/or non-automated rollers) and upper level container 185A-C may descend into given upper level container bay 140A, 140B based, in part, by gravity.

In some examples, the one or more upper level container bays 140A, 140B may be angled downwardly away from upper level conveyor 150. The angle of the upper level container bay conveyor 145 may be based on the capabilities of said conveyor and/or the friction of said conveyor. For example, the incline of the upper level container bay conveyor 145 may be as steep as possible towards the operator, while also allowing the conveyor to provide and retrieve the upper level containers 185A-C. In some embodiments, the angle of each upper level container bay 145 may be from approximately 5 degrees to approximately 15 degrees towards the operator. In some embodiments, the angle of each upper level container bay 145 may be from approximately 10 degrees to approximately 15 degrees towards the operator. In some embodiments, the angle of each upper level container bay 145 may be approximately 13 degrees. In some embodiments, the angle may be less than 5 degrees towards the operator. In some examples, a panel may be positioned or otherwise formed at the distal end of the upper level container bay conveyor 145 so as to retain the upper level containers 185A-C and/or to provide support for a user.

Figure 1B:
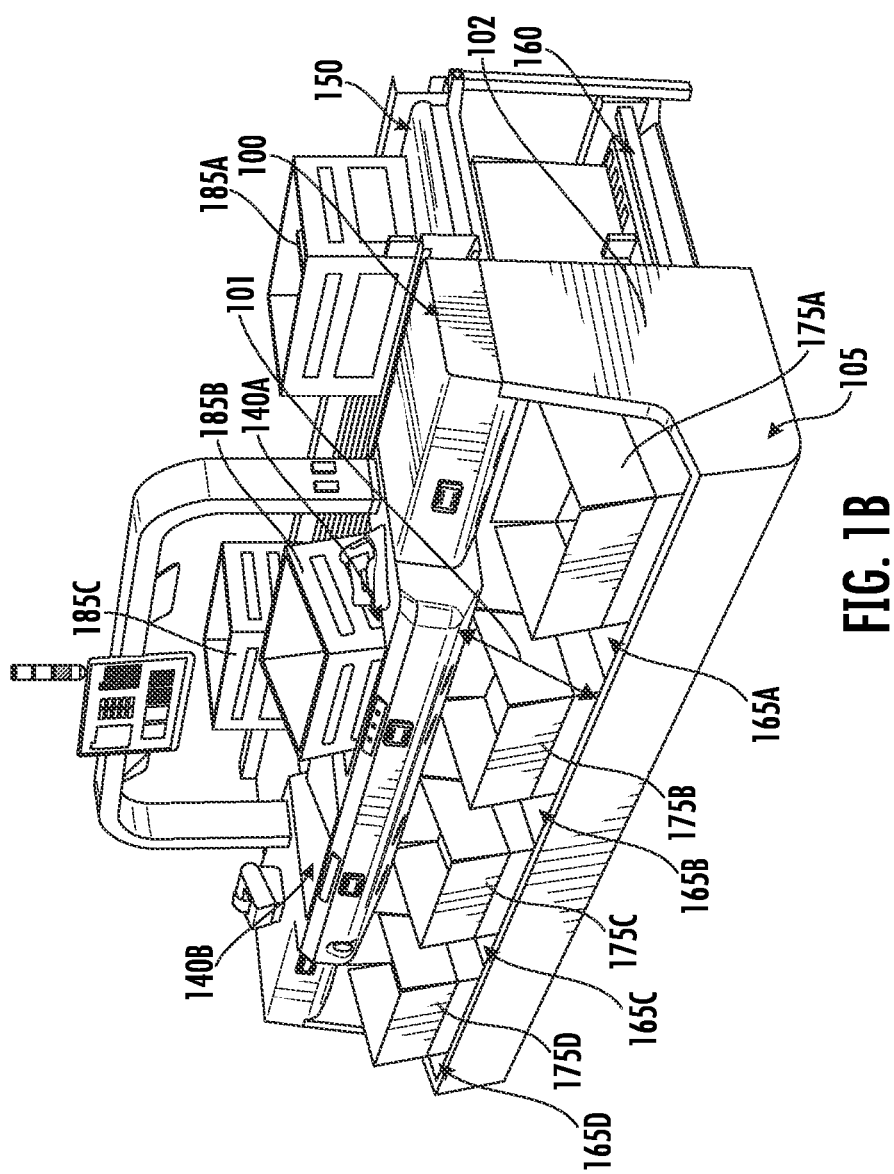

The upper level 100 may also include counter space adjacent the upper level container bay(s) 140A, 140B, such that GTO workstation tools may be easily accessible. As shown in FIGS. 1A and 1B, a scanning device 135 (e.g., a pistol grip scanning device, a portable scanner, an RFID scanner, an imaging apparatus, and/or the like) may be provided adjacent to one of the upper level container bays 140A. In various embodiments, the scanning device 135 may be moveable relative to the upper level 100 (e.g., an operator that is left-handed may prefer the scanning device to be on the opposite side of upper level container bays). In various embodiments, the scanning device may be integrated into the GTO workstation 10. Alternatively, the scanning device 135 may be fixable to the GTO workstation 10 by a user. In each of the embodiments, scanning device 135 may be configured to automatically and/or in response to user interaction, activate and identify one or more items by way of an image, a bar code, an RFID tag, and/or the like.

In various embodiments, a printing device 190 may also be provided on the upper level. For example, the printing device 190 may print labels for the lower level containers 175A-D (e.g., shipping labels may be printed and attached to the lower level containers 175A-D by the operator). The printing device may take the form of a thermal printing device, a laser printing device, and/or the like.

As shown in FIGS. 1A and 1B, a printing device 190 may be provided adjacent to one of the upper level container bays 140A. In various embodiments, the printing device 190 may be moveable relative to the upper level 100 (e.g., an operator that is left-handed may prefer the scanning device to be on the opposite side of upper level container bays). In various embodiments, the printing device 190 may be integrated into the GTO workstation 10 so that shipping labels, invoices, and/or the like are generated in conjunction with placement of one or more items in the lower level containers 175A-D. Alternatively or additionally, the printing device 190 may be fixable to the GTO workstation 10 by a user. In various embodiments, the printing device 190 may merely non-fixably sit on the upper level 100. Various other devices may be provided on the upper level 100 of the GTO Workstation to assist the operator during operation. The upper level 100 of the GTO Workstation 10 may include an area for packing materials (e.g., dunnage, dunnage dispenser, tape, tape dispenser, tape gun, and/or the like). Additional devices may be provided based on the use of the GTO workstation. For example, in an instance in which the GTO workstation 10 is used in a food shipping facility, an area for one or more temperature sensors (e.g., pistol grip temperature sensors) may be provided on the upper level 100 in order to ensure proper temperature at time of packing. The upper level 100 may include additional counter space for worker personal items, such as coffee, drink, food, phone, and/or the like.

In various embodiments, an overhead mount 115 is provided. The overhead mount 115 may extend over one or more upper level container bay 140A, 140B in an arc (e.g., as shown in FIG. 1A, the overhead mount 115 extends over the first upper level container bay 140A and the second upper level container bay 140B). In some examples the overhead mount 115 is aligned with the one or more upper level container bay 140A, 140B.

The overhead mount 115 may have two vertical members 116 extending from or attached to the upper level 100. Each of the vertical members 116 may extend vertically from the upper level 100 and are attached to or integrally formed with a horizontal member 117. The vertical members 116 may each extend from opposite side of one or more upper level container bay 140A, 140B. The connection between each vertical member 116 and the horizontal member 117 define a curved shape in some example embodiments. The height of the horizontal member 117 may be based on the size of the intended operator (e.g., the horizontal member 117 may be approximately even with the eye level of an average user).

In some embodiments, such as shown in FIG. 1A, the overhead mount 115 may include one or more integrated displays 120, one or more container blind spot mirrors 130A, 130B, one or more electrical outlets 195, one or more scanning devices, one or more illumination sources, and/or the like. Alternatively, a single overhead mount 115 may be provided for a given upper level container bay.

In various embodiments, the integrated display 120 may be provided on the horizontal member 117 of the overhead mount 115. The integrated display 120 may be provided in approximately the center of the horizontal member 117 (e.g., centered above the one or more upper level container bays 140A, 140B). The integrated display 120 may provide picking operation information to the operator during operation.

The integrated display 120 may also be adjustable. The integrated display 120 may be moved up and down. The integrated display 120 may be tiltable, such that a shorter operator could tilt the top of the integrated display towards the operator or a taller operator could tilt the bottom of the integrated display towards the operator, to ensure a satisfactory view for the operator. An adjustable integrated display 120 may allow for multiple operators of different sizes to operate the same GTO workstation effectively.

The integrated display 120 may provide information to an operator relating to the status and/or contents of the upper level container bay 140A, 140B and the intended lower level container bay 165A-D. In some examples, integrated display 120 may provide instructions to the operator or user so as to allow the operator or user to pick items from the upper level containers 185A-C and place them in the lower level containers 175A-D. In some examples, the integrated display 120 provides an order in which one or more items are picked, a destination for one or more items, and/or the like. In some examples, ordering can be based on predetermined algorithms, based on characteristics of the items, size of the operator, and/or the like. In some examples, ordering may be learned based on an analysis as to how a particular operator picked items in the past, based on speed, and/or the like.

In some examples, a square representing each given bay (upper level container bay 140A, 140B and/or lower level container bay 165A-D) is provided on the user interface of the integrated display 120. The square representing the upper level container bay 140A may be highlighted to indicate to the operator that the operator should retrieve objects out of the second upper level container 185B, which is in the first upper level container bay 140A. Additionally, the integrated display 120 also indicates the lower level container bay(s) 165A, 165B to which the operator should dispose the objects retrieved from the first upper level container bays (e.g., the right two lower level container bays 165A, 165B are indicated as destinations for the objects retrieved from the second upper level container 185B).

Figure 1D:
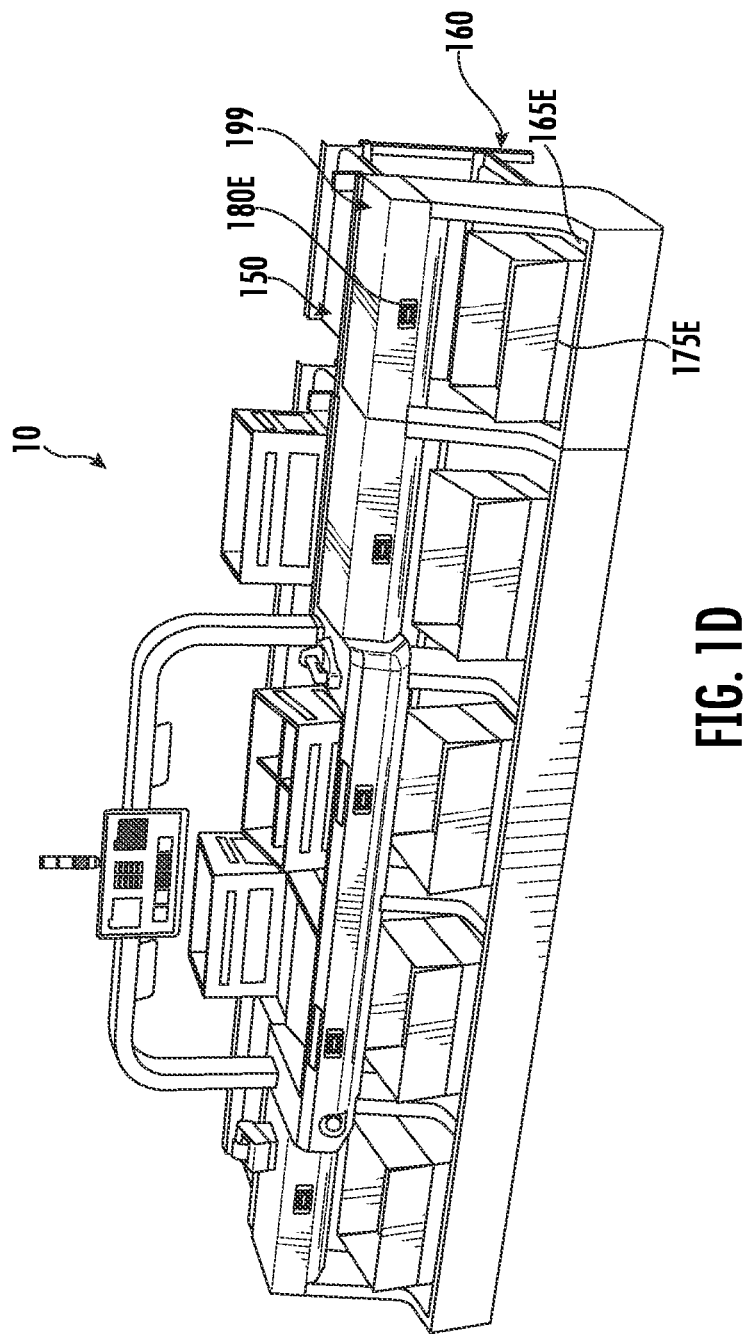
Figure 2D:
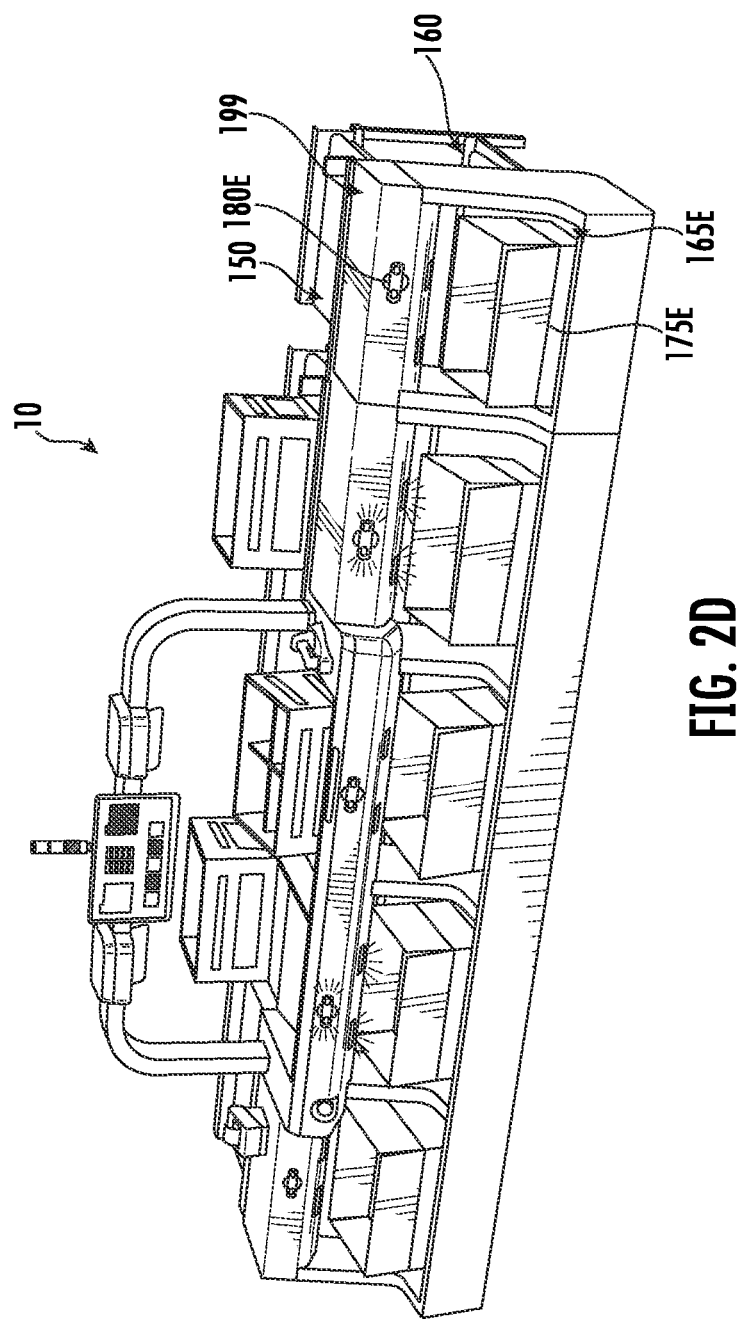
Figure 3A:
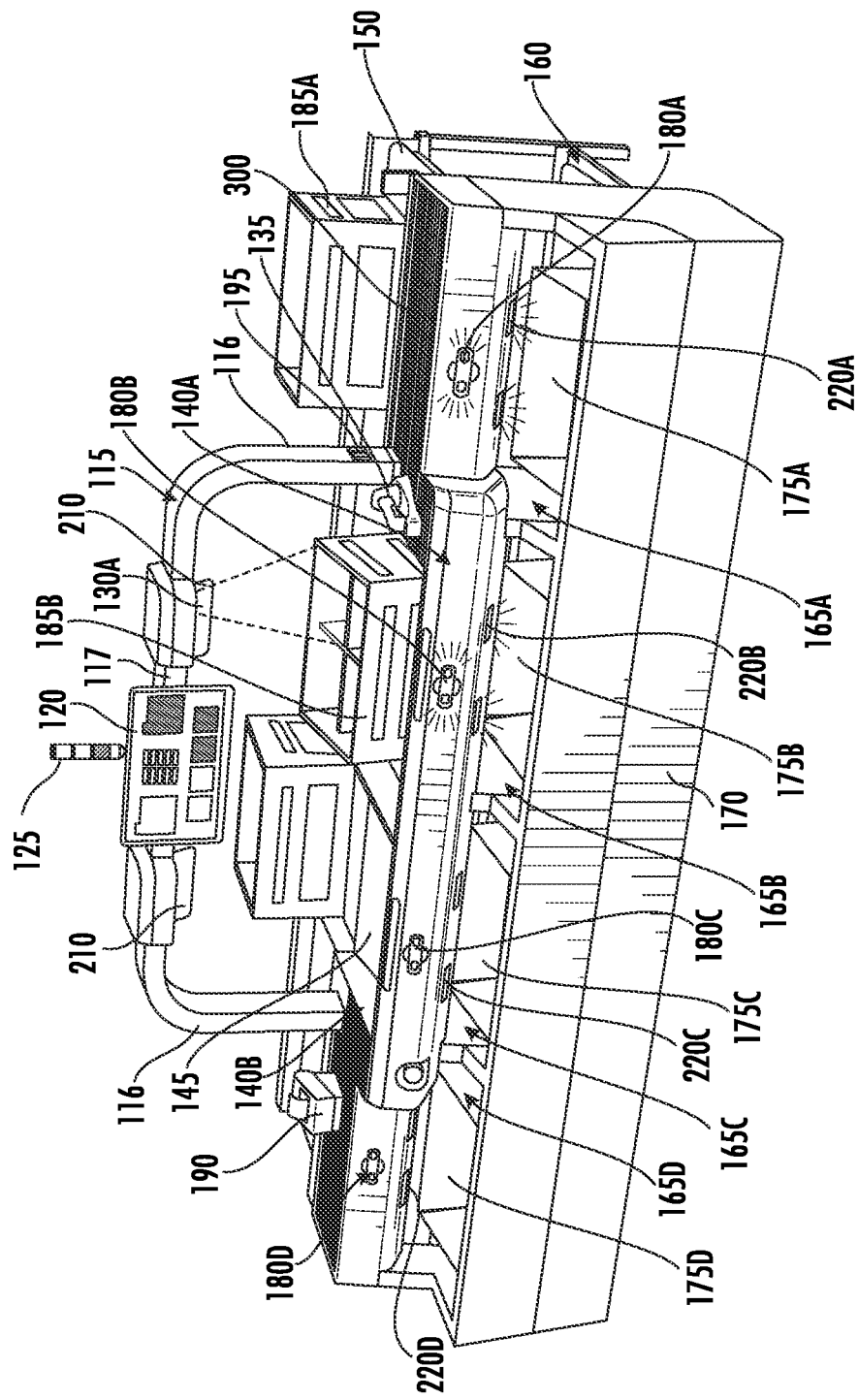
FIGS. 3A-3D illustrate various views of a goods to operator workstation in accordance with a second embodiment of the present disclosure.
Figure 3B:
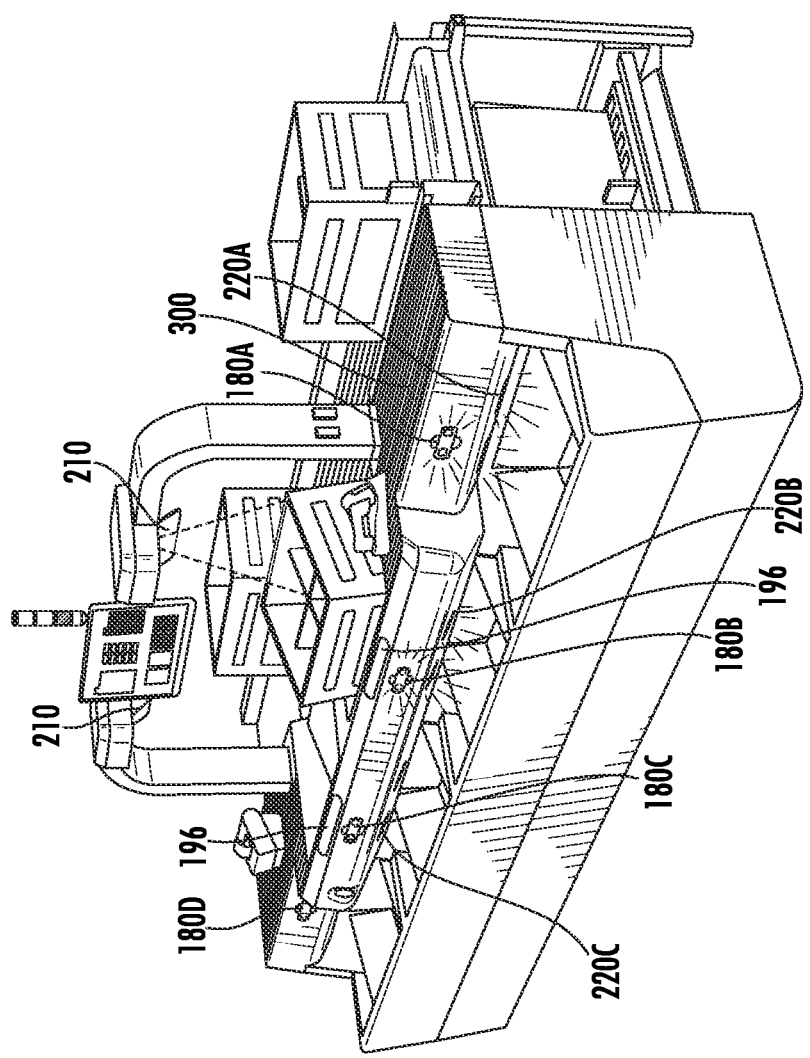
Figure 3C:
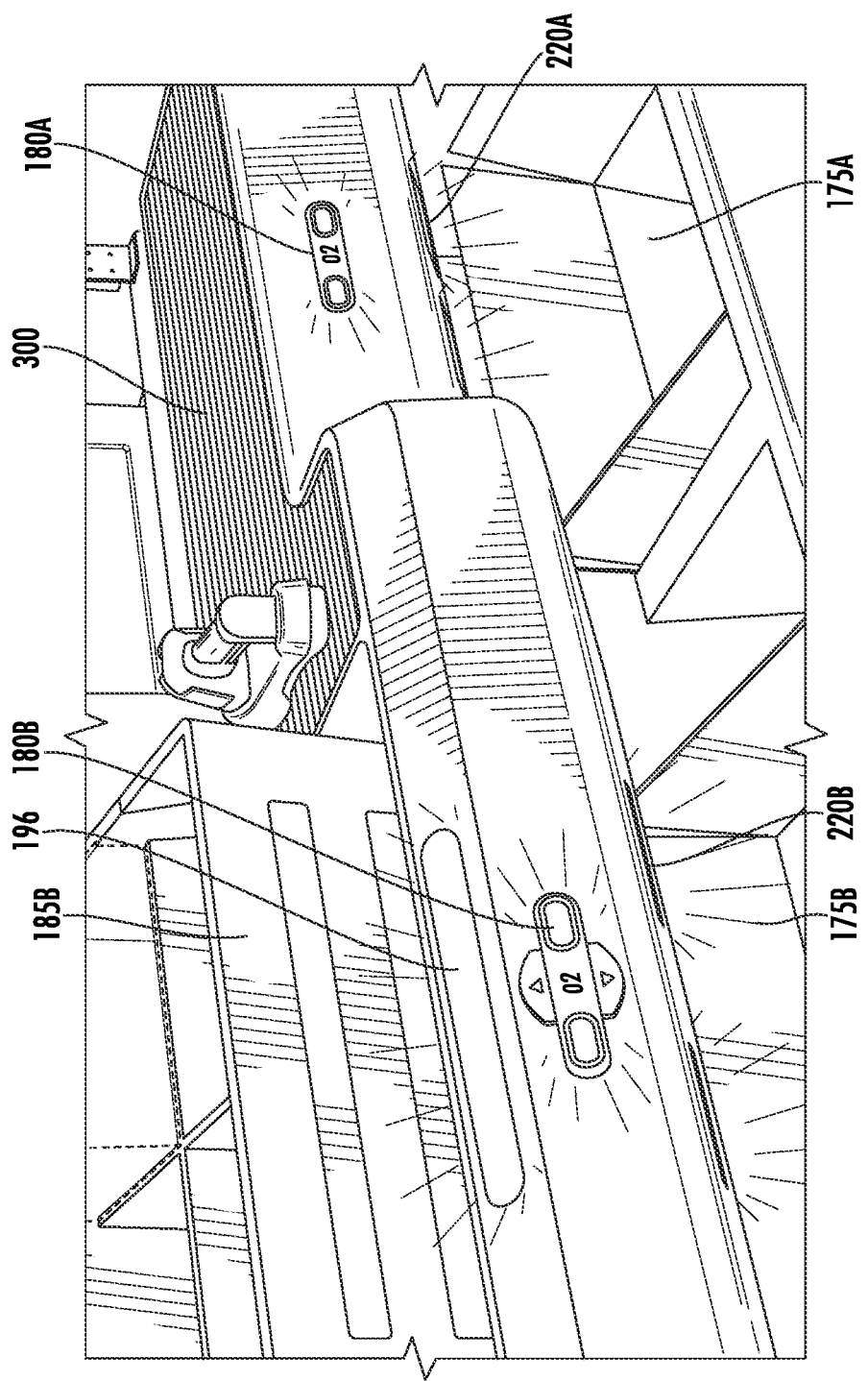
Figure 3D:
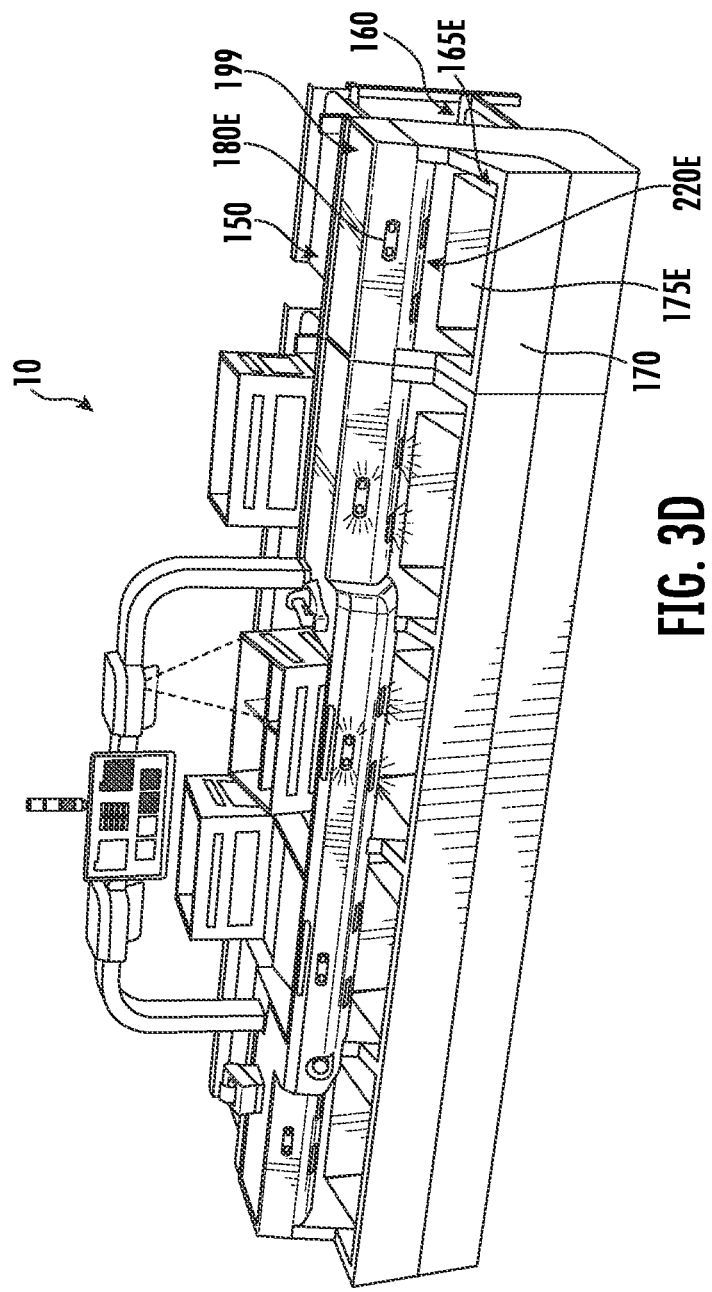

In some embodiments, the user interface on the integrated display 120 may provide a representation of each given bay from the perspective of the operator. For example, as shown in FIG. 1A, two squares on the top of the user interface may represent the two upper level container bays 140A, 140B shown in FIG. 1A. The four lower squares may represent the four lower level container bays 165A-D. As shown in FIGS. 1D, 2D, and 3D, in an instance in which a modular sidecar 199 is coupled to the GTO workstation 10, the user interface of the integrated display 120 may also provide a representation for any additional lower level container bays 165E and/or upper level container bays (not shown). For example, a fifth square is shown on the bottom to indicate the additional lower level container bay 165E.

The corresponding square may be colored, shaded, or otherwise shown as elected in an instance in which the operator is to interact with a container in the given bay. For example, as shown in FIG. 1A, the first upper level container bay 145A is shaded to indicate that the operator should retrieve objects from the upper level container 185B in that upper level container bay 145A and dispose such objects into the lower level containers 175A, 175B in the first lower level container bay 165A and the second lower level container bay 165B. The user interface on the integrated display 120 may also provide information about the number of items to be retrieved from a given upper level container or disposed in a given lower level container.

A unit signal light 125 may be provided on the horizontal member 117 of the overhead mount 115. The unit signal light 125 may include one or more lights that indicate the status of the GTO workstation 10. For example, the unit signal light 125 may include a green light to indicate that the GTO Workstation 10 is operating and a red light to indicate that the GTO workstation 10 is not currently operating. Alternatively, the unit signal light 125 may only have 1 light (e.g., an on/off light). The unit signal light 125 may also have additional lights to indicate various different operating states. The one or more lights on the unit signal light 125 may also have different illumination patterns to indicate different states. For example, one or more of the lights of the unit signal light 125 may blink in an instance a supervisor is needed.

A container blindspot mirror 130A, 130B may be provided along the horizontal member 117 above each given upper level container bay 140A, 140B. The container blindspot mirror 130A, 130B may be angled such that the operator is able to see the contents of an upper level container in an instance in which the container is in the given upper level container bay 140A, 140B. In various embodiments, an operator may use the container blindspot mirror 130A, 130B to check the contents of the given upper level container in an instance the operator cannot easily see into the box.

In some examples, one or more light sources (not shown) may be provided along the horizontal member. In operation, the one or more light sources may illuminate a container or portion of the container indicating to an operator or user what to pick next. In some examples, the light sources may be different colors and may include different patterns.

One or more electrical outlets 195 may be provided along the vertical members 116 and/or the horizontal member 116. The electrical outlet(s) 195 may allow for one or more pieces of equipment used during operation to be plugged in.

The lower level 105 of the GTO workstation 10 may be provided beneath the upper level 100 of the GTO workstation 10. In some examples, the lower level may have the same or similar footprint as the upper level.

The lower level 105 may contain one or more lower level container bays 165A-D, which may receive a lower level container 175A-D. The lower level containers 175A-D may be a destination container for one or more objects retrieved by an operator out of the upper level containers 185A-C. A partition may be provided between each of the lower level container bays 165A-D.

In various embodiments, the size of each lower level container bay 165A-165B may be based on the size of the intended box to be used in the GTO workstation. For example, the width and length of the lower level container bay 165A-165B may be slightly higher than the respective width and length of lower level container intended for the given GTO Workstation. In some examples, the size of each lower level container bay 165A-165B may be adjustable in the height direction (e.g., the size of the length and the width may be fixed, but the height may be adjustable via an increase in the gap 101 discussed in reference to FIG. 1B).

Each lower level container bay 165A-D may have a lower level container bay conveyor (not shown) underneath the lower level containers 175A-D shown in FIG. 1A-1B. The lower level container bay conveyor may retrieve the lower level containers in the given lower level container bay and provide it to the lower level conveyor 160, which takes the lower level container to a destination (e.g., when the lower level container is a shipping box, the lower level conveyor may transport the lower level containers to the shipping department). In various embodiments, the lower level containers 175A-D may be transported to the lower level conveyor 160 once the operator indicates that the correct amount of objects have been placed in the given lower level container.

Figure 1C:
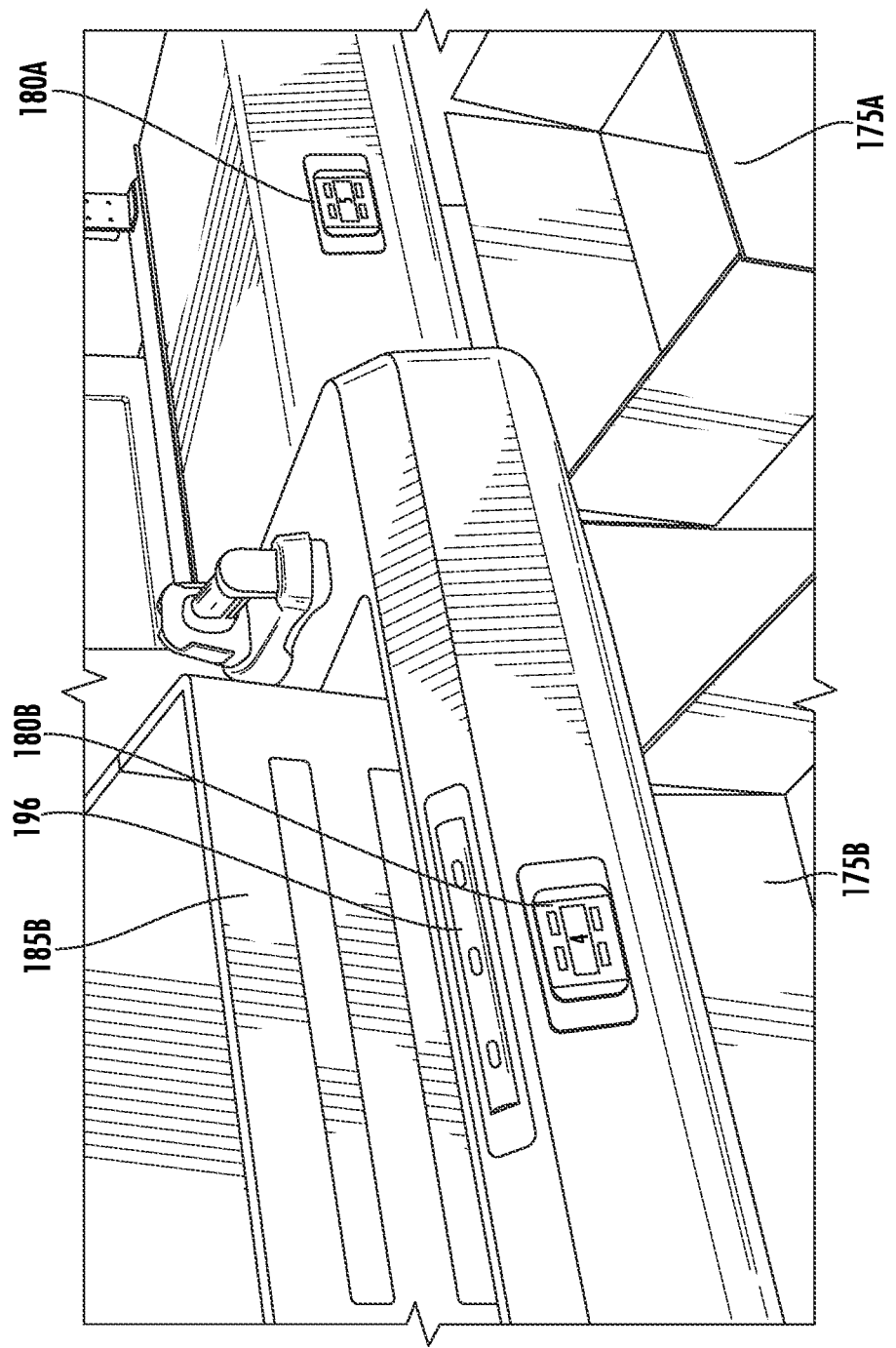

As shown in FIG. 1C, the GTO workstation 10 may include an object selection indicator (e.g., 180A, 180B). The object selection indicator 180A-D may be provided above one or more lower level container bay 165A-D along the upper level 100 of the GTO workstation 10. The object selection indicator 180A-D may indicate or otherwise instruct a user as to the number of objects to be placed in each lower level container 175A-D.

The object selection indicator 180A-D may include an operator interface that allows an operator to indicate an instance in which an object is placed in the given lower level container 175A-D. In some instances, the operator may indicate each time an object is placed into the given lower level container 175A-D (e.g., the object selection indicator 180A-D may change from needing 4 of the given object to 3) or alternatively, the indication may only occur in an instance all of the intended objects are in the given lower level container 175A-D (e.g., the operator may activate the object selection indicator 180A-D upon placing the correct number of objects in the given lower level container 175A-D). The object selection indicator 180A-D may include a screen and one or more user engageable buttons (e.g., the buttons may be a part or separate from the screen).

Additionally or alternatively, in some examples, the upper level container bay 140A, 140B may include a bay indicator 196 along the upper level 100 to indicate the current upper level container from which the operator is to retrieve objects. That is, the upper level 100 may include additional signaling lights, sounds, or the like to indicate from where a user is to pull an item. For example, as shown in FIG. 1C, the bay indicator 196 is a light bar illuminated directly below the first upper level container bay 140A, that indicates that the objects are to be retrieved from that upper level container 185B, while the second upper level container bay 140B light bar is not illuminated. In some examples, each bay may comprise one or more indicator lights.

Bay indicator 196 and object selection indicator 180 may be configured to operate together in some examples. For example, an indication of an item to be picked may be indicated by bay indicator 196. Bay indicator 196 may remain illuminated until the operator indicates via object selection indicator 180 that an item has been placed in a lower level container. Alternatively or additionally, bay indicator 196 and object selection indicator 180 may be activated/deactivated or otherwise incremented based on weight, detection of the presence/absence of an item via image analysis, user iterated, or the like.

As shown in at least FIG. 1B, the GTO workstation 10 may define a gap 101 between the upper level 100 and the lower level 105, such that the lower level container 175A-D may be placed into the given lower level container bay 165A-D by the operator. The gap 101 allows for the lower level containers to be disposed into the given lower level container bay, instead of having to assemble the lower level containers (e.g., cardboard boxes) elsewhere and transport them to the lower level container bays via a conveyor or the like.

The gap 101 may be defined by the distance between the edge of the upper level 100 and the lean-to-panel 170 (e.g., as shown by the arrow referenced as the gap 101 in FIG. 1B). The length of the gap 101 may be based on or otherwise correlate to the size of the maximum lower level container to be placed and/or otherwise used in the lower level. For example, the length of the gap 101 may be slightly larger or equal to the height of the maximum lower level container 175A-D to be disposed therein. For example, in an instance in which the GTO workstation is configured to use a maximum sized lower level container of 16 inches, the gap 101 may be approximately equal to or slightly larger than 16 inches. In some embodiments, the gap 101 may be longer than the maximum intended lower level container height. In some embodiments, the gap 101 may be approximately 0 inches to approximately 1.5 inches longer than the intended maximum lower level container height. In some embodiments, the gap 101 may be approximately 0.5 inches to approximately 1.5 inches longer than the intended maximum lower level container height. In some embodiments, the gap 101 may be approximately 1 inch longer than the intended maximum lower level container height (e.g., for a 16 inch tall lower level container, the gap 101 may be approximately 17 inches).

Various GTO workstations 10 may be manufactured in different sizes based on the size of the intended lower level container. For example, to accommodate containers of different sizes and/or shapes. In an instance in which the intended lower level container size is larger, the level connector panels 102 may be built in an extended fashion or may be configurable such that they can be expanded via hydraulics or via a spacer (not shown) that may be placed between the level connector panels 102 and the upper level 100. For example, the upper level 100 may be approximately 6 inches taller in an instance in which the maximum lower level container size is 22 inches tall than an instance in which the maximum lower level container size is 16 inches tall.

In some instances, in which the upper level 100 is raised, a platform (not shown) may be provided for the operator to stand on during operation. The platform may run the length of the GTO workstation to allow an operator to move from one container to another without additional stepping or risk of falling. In such examples the integrated platform may be attached to the lower level 105 and may be configured to be fixedly attached. In other examples, the integrated platform may be folded into a vertical storage position or may be urged under the lower level 105.

A lean-to-panel 170 may be provided to allow an operator to reach for objects in an upper level container 185A-C. Additional embodiments, discussed below, may have larger lean-to-panels so as to account for containers of different sizes.

Referring now to FIG. 1D, GTO workstation 10 may comprise a modular sidecar 199 operably coupled to the GTO workstation 10. In some examples, the modular sidecar 199 may be electrically and/or mechanically coupled to the GTO workstation 10. In some examples, the GTO workstation may define a sidecar coupler on each side of the GTO workstation (e.g., along the direction of the upper level conveyor 150 and the lower level conveyor 160).

The modular sidecar 199 may take the form of one of various sidecar types. For example, as shown in FIG. 1D, the modular sidecar 199 includes an extension of the upper level conveyor 150 and the lower level conveyor 160, in addition to another lower level container bay 165E (e.g., which may receive another lower level container 175E). Alternatively or additionally, the modular sidecar 199 in various embodiments, may include another GTO workstation 10 that is in wired or wireless communication with the first GTO workstation 10. In each embodiment, the modular sidecar 199 may provide plug and play connectability so as to allow integration with already operator GTO workstations 10.

The GTO workstation may define a sidecar coupler configured to engage with a coupler on the modular sidecar 199. In various embodiments, the modular sidecar 199 may automatically engage with the GTO workstation 10 (e.g., the modular sidecar coupler clicks into engagement with the sidecar coupler of the GTO workstation when urged together). Additionally or alternatively, an operator may engage a locking mechanism on the GTO workstation to fixably couple the modular sidecar 199 to the GTO workstation 10. The modular sidecar 199 may include multiple couplers, such that a modular sidecar 199 may be coupled to the GTO workstation 10 on one side and another modular sidecar 199 on another.

Each modular sidecar 199 may include one or more capabilities of the GTO workstation and/or may interface so as to receive signals from the GTO workstation. That is, the modular sidecar 199 may receive signals from and transmit signals to the GTO workstation 10 so as to enable picking operations, such as those described above. As shown, the modular sidecar 199 may include an object selection indicator 180E, an object indication light 220E, a foam surface 300, an upper level conveyor, a lower level conveyor, and/or a lower level container bay. A modular sidecar may include additional capabilities, such as, but not limited to, an integrated display, a computer, or the like.

In various embodiments, the GTO Workstation 10 may be configured to couple with multiple modular sidecars at once. The GTO workstation 10 may define a sidecar coupler configured to engage with a coupler on each side of the GTO workstation (e.g., at opposite ends of the upper level conveyor 150). The modular sidecars 199 may also couple to other modular sidecars 199, such that there may be more than one modular sidecar 199 on a given side of the GTO workstation (e.g., the GTO workstation 10 may be coupled to a modular sidecar 199 and that modular sidecar 199 may also be coupled to another modular sidecar 199). In some embodiments, the configuration of coupled modular sidecars 199 may be asymmetrical (e.g., the number of modular sidecars 199 coupled to one side of the GTO workstation 10 may be different than the number of modular sidecars 199 coupled to the other side of the GTO workstation 10). For example, the GTO workstation 10 may be coupled to three modular sidecars 199 on one side and only one modular sidecar on the other side of the GTO workstation 10. Alternatively, the configuration of modular sidecars may be symmetrical (e.g., the same number of modular sidecars 199 may be coupled to one side of the GTO workstation 10 as the other side of the GTO workstation).

Referring now to FIGS. 2A-2D, another example embodiment of a GTO Workstation 10 is shown. The GTO workstation 10 may include the features discussed in reference to FIGS. 1A-1D.

In the example GTO Workstation 10 of FIGS. 2A-2D, the overhead mount 115 may include one or more indicator projectors 210 to indicate which upper level container 185A-C is to be retrieved. The indicator projector 210 may be adjacent to the container blindspot mirror 130A, 130B shown and discussed in reference to FIGS. 1A and 1B. The indicator projector 210 may also illuminate multiple compartments of the given upper level container 185A-C in an instance the operator is to retrieve objects from more than one compartment (e.g., the same type of object may be in multiple compartments or the different compartments hold complimentary objects that are to be placed into one or more of the same lower level containers).

Figure 2A:
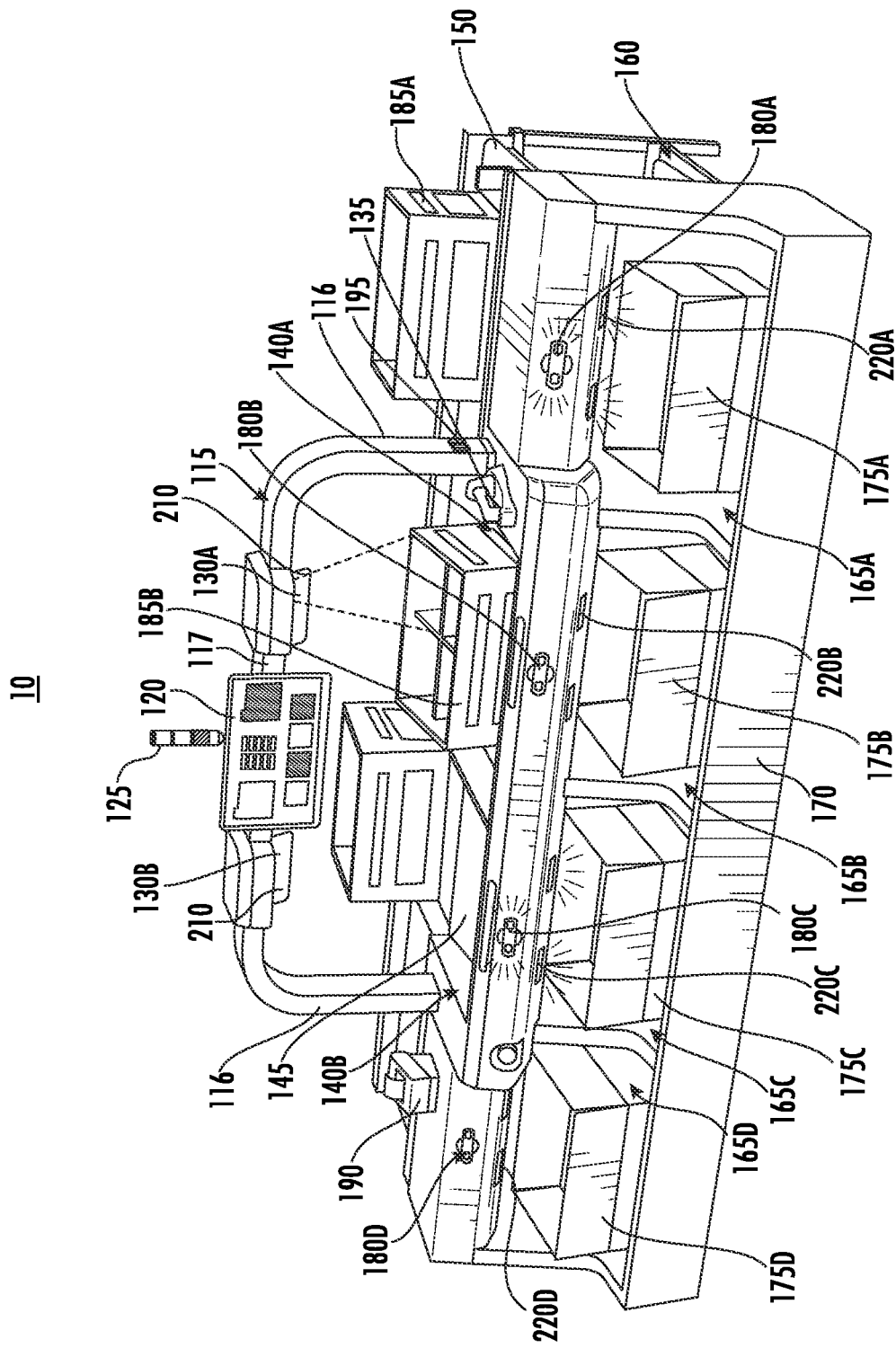
Figure 2B:
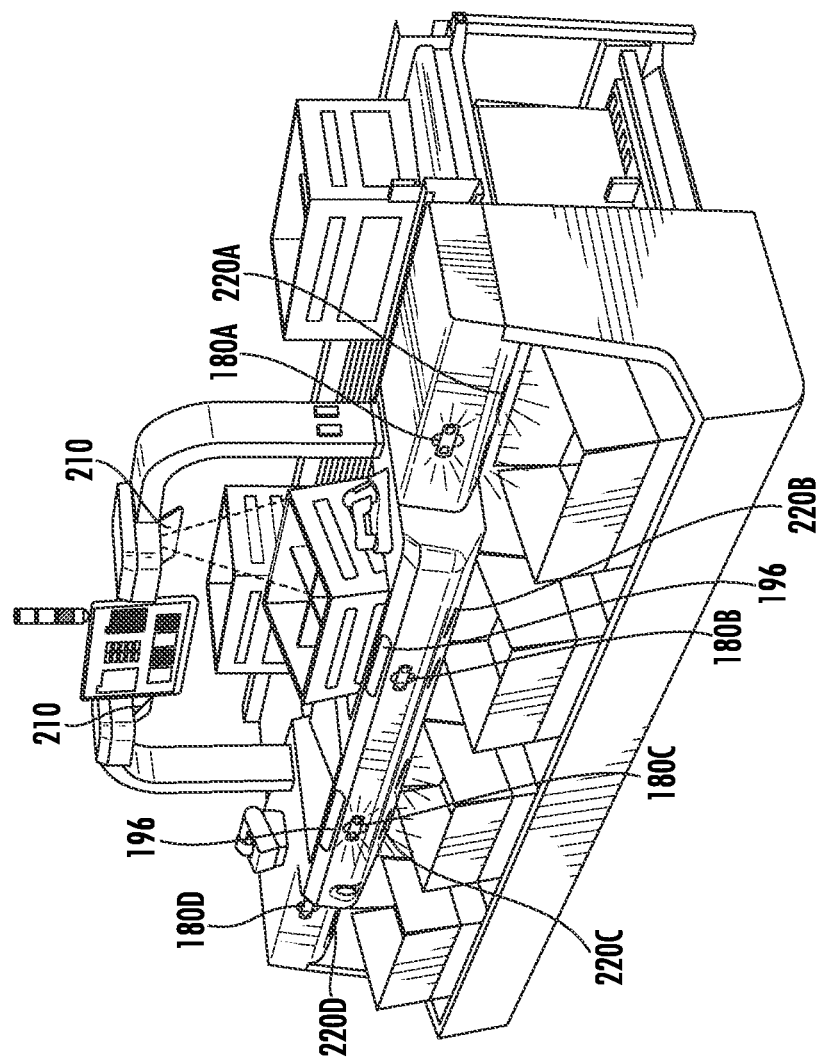

In some examples, the upper level container 185A-C may be subdivided, as shown in FIG. 2A. In such an embodiment, the indicator projector 210 may illuminate one or more of the subdivisions from which the operator is to retrieve objects. For example, as shown in FIG. 2A, the second upper level container 185B is divided into four compartments within the container and the top right compartment is illuminated by the indicator projector 210, indicating that the operator should retrieve objects from the top right compartment.

The GTO workstation 10 may include additional or alternative designs for the object selection indicator 180 and/or bay indicator 196. The bay indicator, as shown in FIG. 2C, may be a light bar that illuminates the entire length of the light bar (as opposed to the three single lights shown in FIG. 1C). The object selection indicator 180 may include a three-button interface that may allow the operator to update the number of objects needed in each lower level container 175A-C during operation. The object selection indicator may also include an object indication light 220 configured to illuminate the lower level container in which the object is to be placed. As shown in FIG. 1A, the object indicator light 220A for the first lower level container bay 165A and the object indicator light 220C for the third lower level container bay 165C are illuminated, indicating that the operator is to disposed a given object into the first lower level container 175A and the third lower level container 175C. In such an instance, the object indicator light 220B for the second lower level container bay 165B and the object indicator light 220D for the fourth lower level container bay 165D are not illuminated, indicating the operator should not place the object(s) into the lower level containers in those bays.

Referring now to FIGS. 3A-3D, an additional or alternative GTO workstation 10 is shown. Various components discussed in reference to FIGS. 3A-3D may be the same or similar to those used in FIGS. 1A-2D. With respect to FIGS. 3A-3D, the additional or alternative GTO workstation 10 may comprise an alternative or additional lean-to-panel 170.

In various embodiments, the lean-to-panel 170 may extend higher vertically away from the ground, to allow more of a leg of the operator to rest on the lean-to-panel 170 when attempting to retrieve objects from the upper level containers 185A-C and/or to secure or otherwise retain the one or more lower level container 175A-175D. In such an embodiment, the gap 101 between the lean-to-panel and the upper level 100 may be reduced and, thus, not be sufficient to receive a lower level container 175A-175D. The lower level container 175A-D may be assembled elsewhere and provided to the given lower level container bay 165A-D by the lower level conveyor 160.

In some examples, a container camera (not shown) may be provided above a given upper level container bay 140A, 140B and/or a given lower level container bay 165A-D. The container camera may monitor the number of objects retrieved from an upper level container 185A-C and/or the number of objects disposed into a lower level container 175A-D. The container camera may provide information to a processor (e.g., the processor 512 shown in FIG. 5) that uses artificial intelligence to determine an instance in which the operator is done with a given container. That is, by analyzing the image, the container camera, in conjunction with a processing system, may inventory and/or identify that the container contains one or more items. In some examples, the container camera, in conjunction with the camera, may determine that all items have been placed in the container. The analysis may be carried out by a camera controller, in conjunction with a processor, as is discussed below in reference to FIG. 5.

In some examples, the container camera, in conjunction with a processing system may rely on a dimensioner to determine the dimensions of one or more products or items in the container and, based on the dimensions, correlate particular dimensions with a particular object that is to be packed. In other examples, the container camera, in conjunction with a processing system may identify one or more indicia, such as a bar code or other label and decode the indicia.

In yet further examples, the container camera, in conjunction with a processing system may capture an image of each item as it is being placed to identify the item. In such examples, the processor may rely on image processing techniques to match a known image of a product with the product in the container.

In yet further examples, the container camera and integrated display 120 may enable virtual or augmented reality. For example, the container camera may provide a real-time or semi-real-time view of a container via integrated display 120. In the view, the integrated display 120 may color, highlight, or otherwise indicate the product to be picked with a first color and the incorrect product with a different color. In other examples, the integrated display 120 may mark or otherwise color a product that was incorrectly placed in a container. Other information about the products, how the product should be packed, how the product should be handled, etc. may also be provided.

For example, the GTO workstation 10 may remove the given container before or instead of an operator indicating that the objects have been retrieved or disposed. Alternatively or additionally, the container camera may provide a visual to either the operator (e.g., via the integrated display) and/or external to the GTO workstation (e.g., a supervisor may be able to watch the container camera in real-time). In some embodiments, the container camera for the upper level container bay 140A, 140B may be disposed adjacent to the indicator projector 210. The container camera may be disposed adjacent to or in place of container blindspot mirrors 130A, 130B shown in FIGS. 1A and 1B.

Additionally, as shown in FIGS. 3A-3D, the upper level 100 may include a foam upper level surface 300. The foam upper level surface 300 may provide a non-skid surface (e.g., to reduce items on the upper level surface 300 from sliding around of the surface). The upper level surface 300 may be a high contrast surface to allow for improved visibility of items on the upper level surface 300. In an instance the upper level surface 300 is foam, the spacing provided can assist in keeping materials dry if a liquid (e.g., an operator's drink) is spilled. The upper level surface 300 may be different colors for cosmetic purposes (e.g., a customer could select the color of the upper level surface). Alternatively or additionally, the upper surface may take the form of wood, plastic, metal, composite, stone, or the like.

As shown in FIG. 3D, the modular sidecar 199 may include the alternative designs discussed herein, such as the alternative design relating to the object selection indicator 180 shown in FIGS. 2A-2D.

In some examples, the GTO workstation may also include voice features. The GTO workstation may be configured, such as via a processor, to identify the location of one or more objects and verbally indicate the upper level container(s) from which to retrieve objects and/or the lower level container(s) to dispose the objects. The verbal indication may be in addition to or instead of any of the illumination indications discussed herein. Additionally, the GTO workstation may have communication capabilities to receive voice commands from an operator. For example, the operator may say a command in an instance a lower level container 175A-D is complete instead of or in addition to engaging the object selection indicator 180A-D. In further examples, the GTO workstation may receive additional voice instructions so as to identify an item, determine a user status, control one or more conveyors, and/or the like.

The GTO workstation 10 may also give visual, audible, and/or tactile instructions to an operator during use. For example, the GTO workstation 10 may provide an indication that one of the lower level container bays 165A-D are empty, such that the operator needs to place a new lower level container into the given bay.

The GTO workstation may also be connected to a network (e.g., wirelessly or via hardwire). As such, the GTO workstation may be monitored external from the GTO workstation. Multiple GTO workstations may be connected via such a network. For example, a supervisor may be able to monitor a plurality of GTO workstations remotely.

Similarly to the above, the GTO workstation 10 may include a sidecar coupler to couple to one or more modular sidecars 199, as shown in FIG. 3D. The modular sidecar 199 may include any of the functionality discussed herein for the other modular sidecars and/or the GTO workstations.

Figure 4:
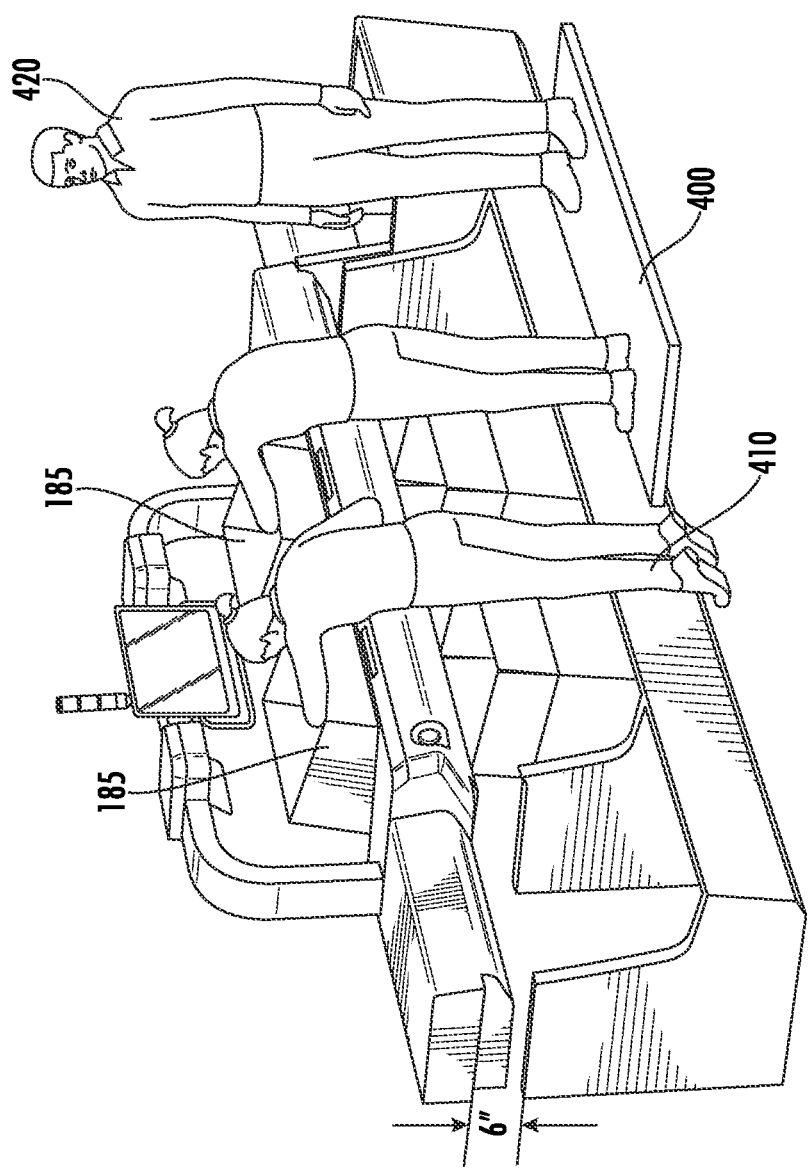
FIG. 4 illustrates example operators interacting with a goods to operator workstation of various embodiments in accordance with the present disclosure.

Referring to FIG. 4, a GTO workstation 10 is provided that may need a platform to be provided. As shown, the upper level 100 is raised (e.g., raised 6 inches to allow for a 22 inch tall container instead of a 16 inch tall container). In such an instance, an operator 410 may not be sufficiently tall to reach the contents in the upper level container 185A-C (e.g., operator 410 has cannot reach the contents of the upper level container while remaining flat footed). The desired height of the upper level may be based on the statistical size of potential users. For example, the desired height of the upper level may be such that 95% of US females may be capable of reaching the contents of the given container. The desired height of the upper level may be between the waist and arm level of an average operator in order to ensure the operators can reach the contents of the given upper level container 185A-C. In various embodiments, the height of the upper level may be based on the region that the given GTO workstation is to be used.

A platform 400 may be provided. The platform 400 may run the length of the GTO workstation 10 to allow the operator to move from one lower level container bay 165A-D to another without risk of falling off the platform. The platform may be stationary (e.g., integrated to the GTO workstation 10 and non-removable). Alternatively, the platform 400 may be retractable or moveable (e.g., the platform may be moved to allow for taller operators, like operator 420, to use the GTO workstation 10 as designed).

Figure 5:
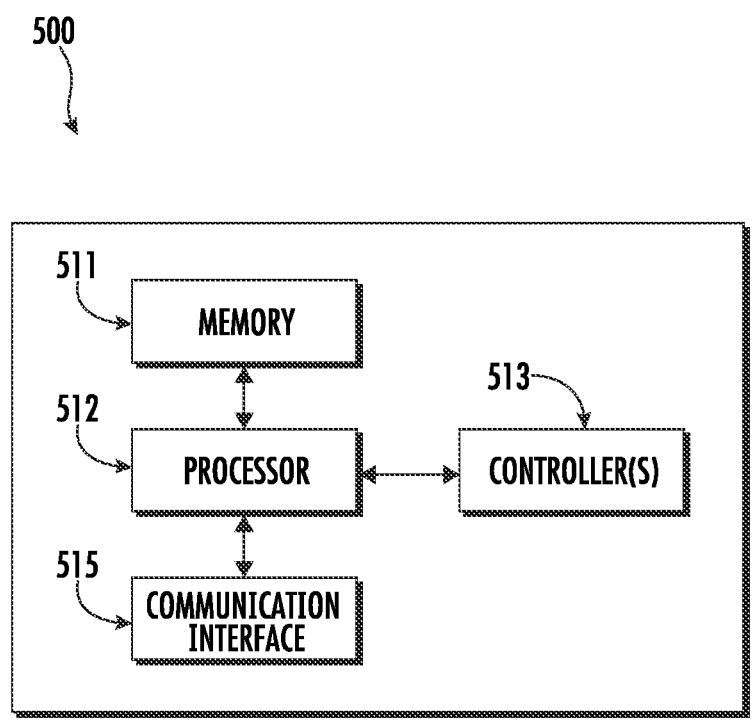
FIG. 5 illustrates an example processing circuitry according to various embodiments of the goods to operator workstation.

Referring to FIG. 5, an example processing circuitry 500 of the GTO workstation 10 is provided. In various embodiments, the GTO workstation 10 may include at least one processor 512 and at least one non-transitory memory 511 including program code. The GTO workstation 10 may also include communication circuitry 515 and one or more controllers 513.

The processor 512 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 512 may include one or more processing cores configured to perform independently. A multi-core processor may enable multiprocessing within a single physical package. Additionally or alternatively, the processor 512 may include one or more processors configured in tandem via the bus to enable independent execution of instructions, pipelining and/or multithreading.

In an example embodiment, the processor 512 may be configured to execute instructions stored in the memory 511 or otherwise accessible to the processor. Alternatively or additionally, the processor 512 may be configured to execute hard coded functionality. As such, whether configured by hardware or software methods, or by a combination thereof, the processor 512 may represent an entity (for example, physically embodied in circuitry) capable of performing operations according to an embodiment of the present invention while configured accordingly. Thus, for example, when the processor 512 is embodied as an ASIC, FPGA or the like, the processor 512 may be specifically configured hardware for conducting the operations described herein. Alternatively, as another example, when the processor 512 is embodied as an executor of software instructions, the instructions may specifically configure the processor to perform the algorithms and/or operations described herein when the instructions are executed. However, in some cases, the processor 512 may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In some embodiments, the processor 512 may be configured to use machine learning or other operations described herein.

The GTO workstation 10 of an example embodiment may also include a communication interface 515 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 515 may be configured to communicate over Global System for Mobile Communications (GSM), such as but not limited to Long Term Evolution (LTE). In this regard, the communication interface 515 may include, for example, an antenna (or multiple antennas) and supporting hardware and/or software for enabling communications with a wireless communication network. Additionally or alternatively, the communication interface 515 may include the circuitry for interacting with the antenna(s) to cause transmission of signals via the antenna(s) or to handle receipt of signals received via the antenna(s). In some examples, the communication interface 515 may communicate with a warehouse controller, an automated storage and retrieval system (AS/RS), a fulfillment center and/or the like, so as to transmit and/or receive instructions related to the operations described herein.

The one or more controllers 513 may be configured to operate one or more portion of the GTO workstation 10 during operation. In various embodiments, the one or more controllers 513 may include a GTO controller, a camera controller, and a voice controller. The GTO controller may carry out the functions of the various conveyors. The GTO controller may, either automatically or upon engagement from the operator, cause the GTO workstation to provide and/or retrieve an upper level container 185A-C from a given upper level bay 140A, 140B (e.g., the GTO controller may cause one of the upper level container bay conveyors 145 to be activated). The GTO workstation 10 may also cause the lower level bay conveyor to be activated to retrieve and/or provide a given lower level container 175A-D from a lower level container bay 165A-D.

The one or more controllers 513 may include a camera controller configured to operate the container camera(s) discussed above. Multiple container cameras and/or other cameras may be controlled via the camera controller. The one or more controllers 513 may also include a voice controller, configured to control any voice features discussed above. Various other controllers may be provided in various embodiments to control and operate various components of the GTO workstation.

Figure 6A:
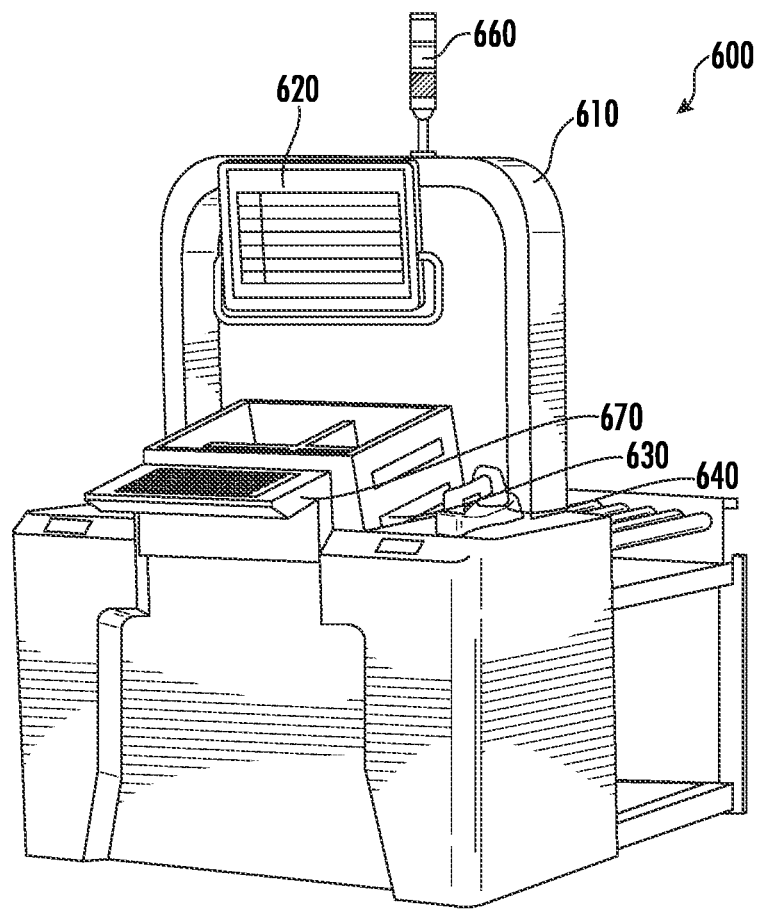
FIGS. 6A and 6B illustrate an accessory workstation of various embodiments.
Figure 6B:
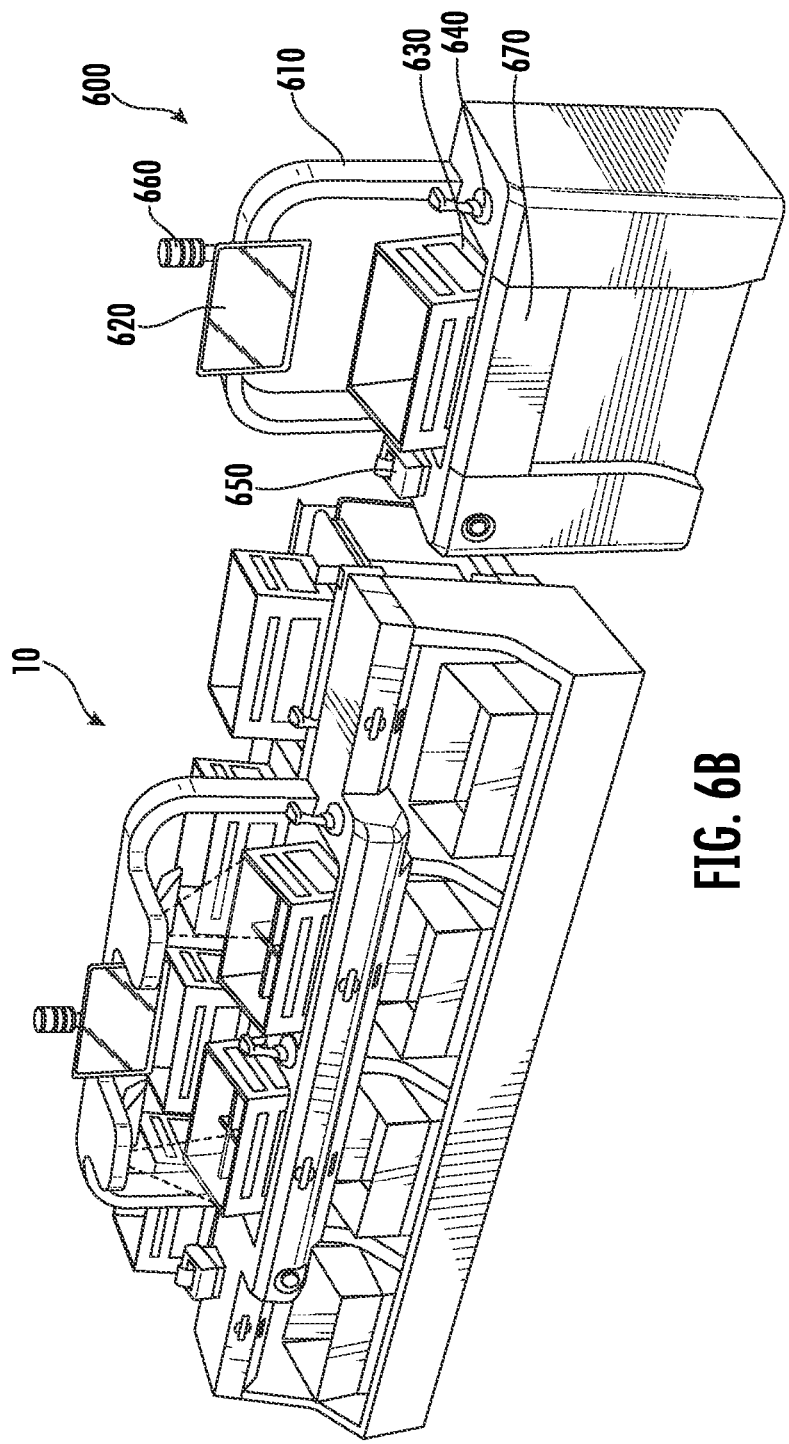

Referring now to FIGS. 6A and 6B, an example accessory workstation 600 is provided. An accessory workstation 600 may include one or more of the components of a GTO workstation 10. For example, as shown, the accessory workstation includes an overhead mount 610, an integrated display 620, a container bay 630, a scanning device 640, a printer 650, and a unit signal light 660. The accessory workstation 600 may also include a retractable keyboard 670 designed to open and close to allow an operator to type into the accessory workstation (e.g., the integrated display 620 may operate as a computer).

The accessory workstation 600 may have a container bay 630 that has a conveyor, with the conveyor being connected to another conveyor (e.g., the upper level conveyor 150). In various embodiments, the accessory workstation 600 may be upstream from the GTO workstation on the feed conveyor (e.g., upper level conveyor) of the upper level containers. As shown in FIG. 6B, the accessory workstation 600 may be used in conjunction with a GTO workstation (e.g., positioned adjacent to one another). The accessory workstation 600 may allow for an operator to replenish items as inventory runs low. The accessory workstation 600 may be a very flexible stations that enable operators to pick from boxes or pallets into totes that will replenish the AS/RS system (e.g., am operator may replenish an upper level container 185A-C after the given objects are retrieved. In various embodiments, lights and diagrams may be provided to the operator with instruction via a light or the integrated display. In various embodiments, the accessory workstation 600 may be used as a quality control (QC) workstation. For example, an upper level container 185A-C and/or a lower level container 175A-D with a known amount and/or type of items may be checked for accuracy (e.g., an operator may check a given container to confirm the appropriate item SKU and/or quantity of items).

Referring now to FIGS. 7A-7D, an example GTO workstation is provided without any lower level containers or upper level containers loaded. As shown, the lower level container bay 165A-165D may each have a lower level bay conveyor 700A-D (discussed above). The lower level bay conveyor 700A-D may be one or more full width belt (FWB) conveyors (e.g., a motor driven roller (MDR) may be provided under the belt to drive the FWB. The lower level bay conveyors 700A-D may be a roller conveyor (e.g., similar to portions of the lower level conveyor 160 and the upper level conveyor 150 shown). The roller conveyor may be motor driven rollers, non-motor driven rollers, or a combination of motor driven rollers and non-motor driven rollers. In various embodiments, all of the various conveyors discussed herein may be a FWB conveyor and/or a roller conveyor.

Figure 7A:
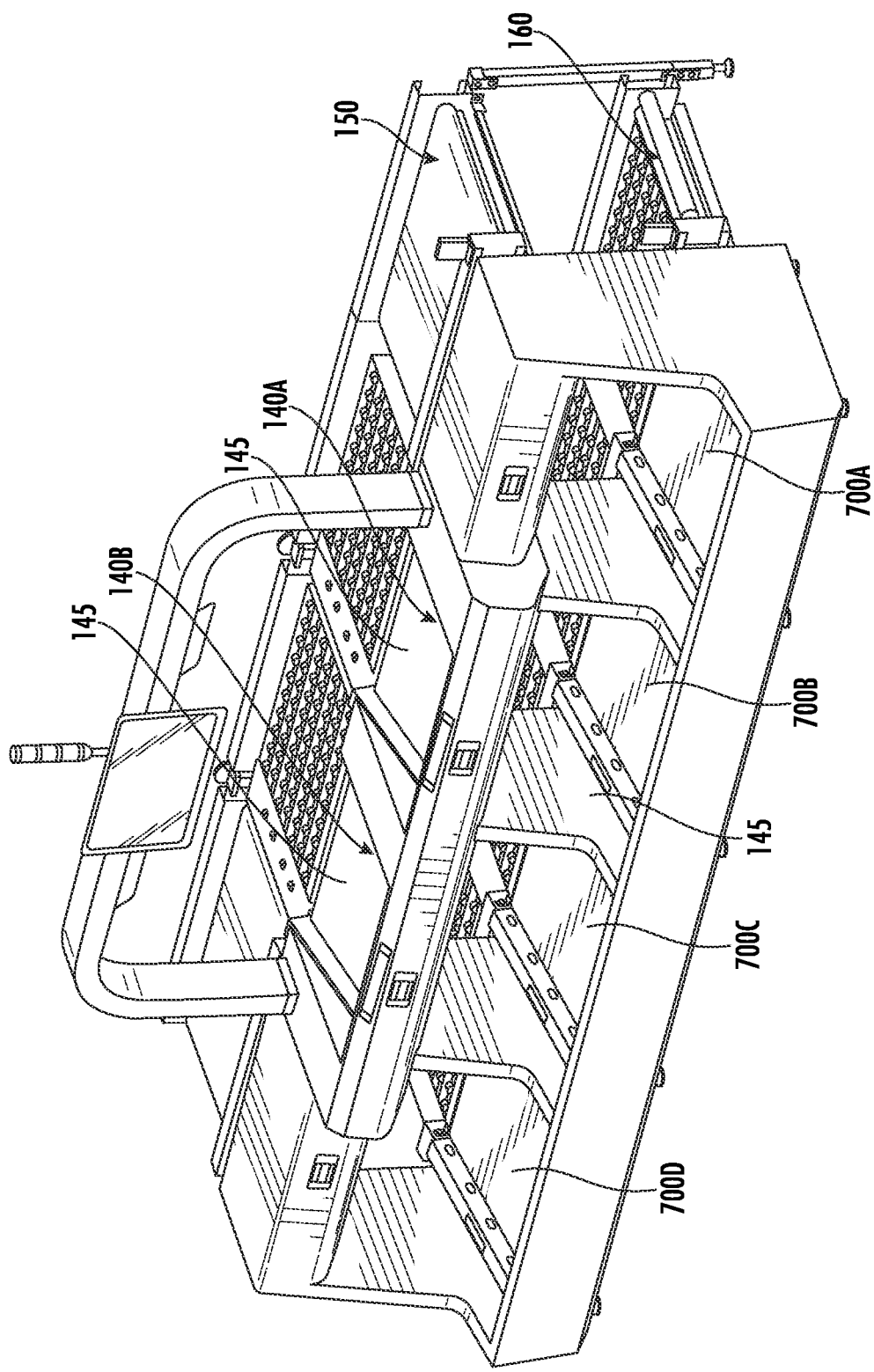
FIGS. 7A-7D illustrate various views of a goods to operator workstation in accordance with an example embodiment of the present disclosure.
Figure 7B:
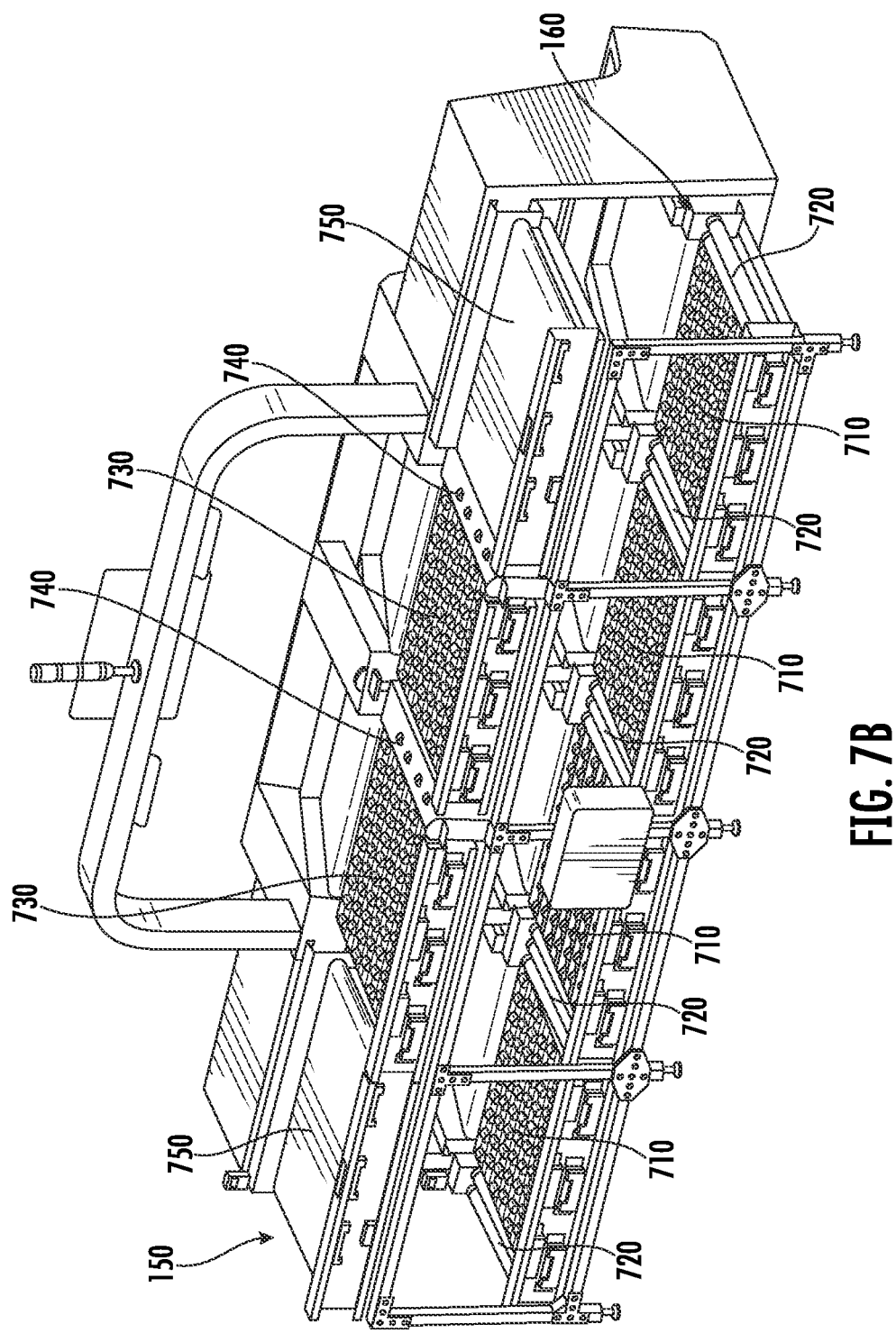

As shown in FIG. 7B, in some embodiments, the entire lower level conveyor 160 may be rollers. The rollers 710 adjacent to the given container bay 175A-175D may be generally parallel to the direction of the lower level conveyor 160. The rollers 710 may be a flat right angle transfer (FRAT). Additional rollers 720 may be provided adjacent to rollers 720 and are generally perpendicular to the direction of the lower level conveyor 160, such that the rollers 720 may move a container along the lower level conveyor 160.

Figure 7C:
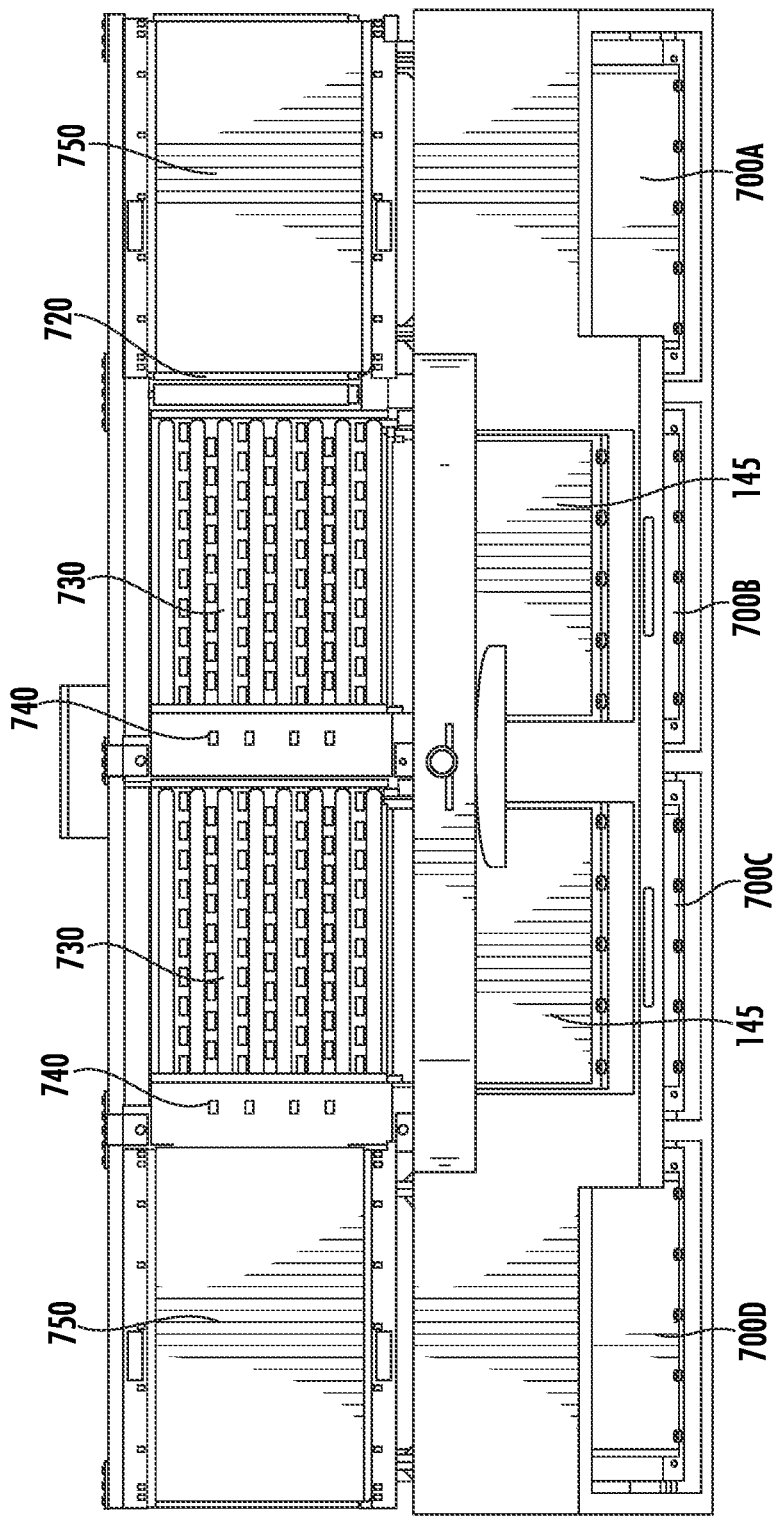
Figure 7D:
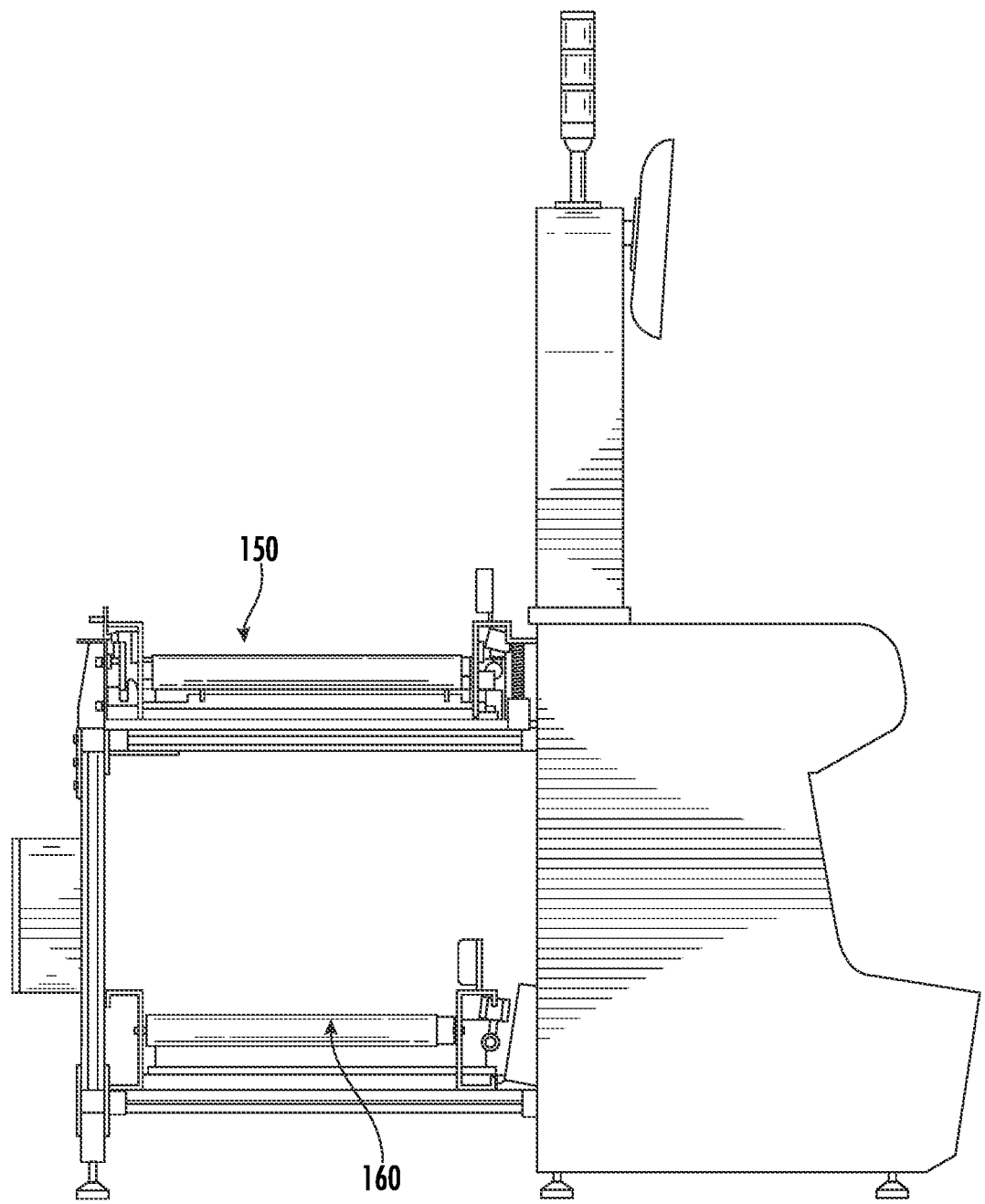

The upper level conveyor 150 may include rollers 730 adjacent to the given upper level container bay 140A, 140B, the rollers 730 being generally parallel to the direction of the upper level conveyor 150. The rollers 730 may be a flat right-angle transfer (FRAT). Popup stopper(s) 740 may be provided adjacent to rollers 730 and are generally perpendicular to the direction of the upper level conveyor 150. The popup stopper(s) 740 may raise up to obstruct the movement of a given upper level container along the upper level, such that the upper level container may be moved into the given upper level container bay 140A, 140B. For example, the given popup stopper(s) 740 may rise above the upper level conveyor 150 surface to stop the given upper level container and after the upper level container has begun or completed moving into the given upper level container bay 140A, 140B. The popup stopper(s) 740 may retract (e.g., lower) to allow other upper level containers to move along the upper level conveyor 150. The upper level conveyor 150 may also include one or more FWB conveyor portions 750 configured to carry a container along the upper level conveyor 150. FIG. 7C also shows a top view of the GTO workstation 10 including the upper conveyor 150. FIG. 7D also shows a side view of the GTO workstation 10 including the upper level conveyor 150 and the lower level conveyor 160. As shown, the upper level conveyor 150 and the lower level conveyor may be generally parallel to one another in the vertical direction.

Figure 8:
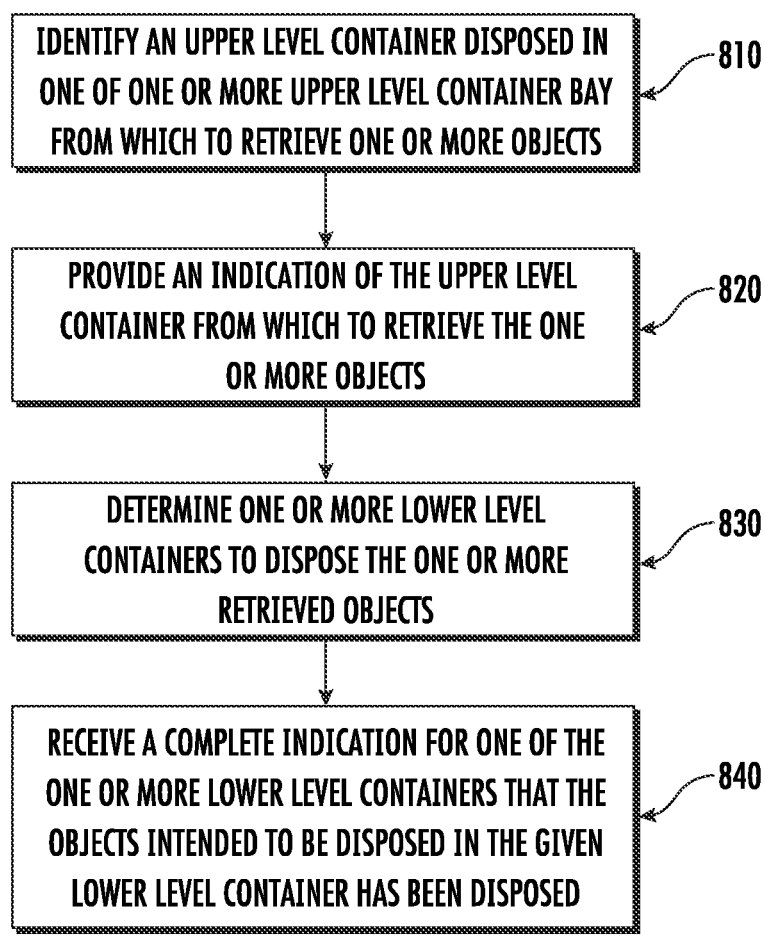
FIG. 8 illustrates a method of operating the goods to operator workstation of an example embodiment in accordance with an example embodiment.

Referring now to FIG. 8, the GTO workstation 10 of an example embodiment includes means, such as the processing circuitry 500, the processor 512, or the like, for operating the GTO workstation 10. Referring to Block 810 of FIG. 8, the GTO workstation 10 of an example embodiment includes means, such as the processing circuitry 500, the processor 512, or the like, for identifying an upper container disposed in one of one or more upper level container bay from which to retrieve one or more objects. In some examples, the processing circuitry 500, the processor 512, or the like may identify the upper container based on a predetermined load of the upper container. For example, the processing circuitry 500, the processor 512, or the like may receive or otherwise access an indication of what item or items are in the upper container. Alternatively or additionally, the processing circuitry 500, the processor 512, or the like may be configured to identify the item or items in the upper container, such as via image analysis, decoding an indicia, receiving a signal, and/or the like.

Referring now to Block 820 of FIG. 8, the GTO workstation 10 of an example embodiment includes means, such as the processing circuitry 500, the processor 512, or the like, for providing an indication of the upper container from which to retrieve the one or more objects. In some examples, the indication may take the form of a light on the front of the GTO workstation, a voice command, a spotlight that shines on a particular container, an image on a screen, and/or the like.

Referring now to Block 830 of FIG. 8, the GTO workstation 10 of an example embodiment includes means, such as the processing circuitry 500, the processor 512, or the like, for determining one or more lower level containers to dispose the one or more retrieved objects. In some examples, the processing circuitry 500, the processor 512, or the like may determine a lower level container based on one or more instructions, previous items placed in the lower level containers or the like. In some examples, the processing circuitry 500, the processor 512, or the like may rely on a model, generated based on supervised or unsupervised learning, to generate instructions for how to dispose or otherwise pack retrieved objects in the one or more lower level containers.

Referring now to Block 840 of FIG. 8, the GTO workstation 10 of an example embodiment includes means, such as the processing circuitry 500, the processor 512, or the like, for receiving a complete indication for one of the one or more lower level containers that the objects intended to be disposed in the given lower level container has been disposed. In some embodiments, the GTO workstation 10 of an example embodiment includes means, such as the processing circuitry 500, the processor 512, or the like, for confirming the placement of the one or more objects into the correct lower level container. In some examples, the processing circuitry 500, the processor 512, or the like may rely on a manual indication such as via a voice command, the actuation of a button, or an interaction with a touch screen to confirm placement of the one or more objects. Alternatively or additionally, the processing circuitry 500, the processor 512, or the like may be configured to identify the item or items in the lower level container, such as via image analysis, decoding an indicia, receiving a signal, and/or the like.

In some embodiments, the GTO workstation 10 of an example embodiment includes means, such as the processing circuitry 500, the processor 512, or the like, for causing the lower level container to be removed from the given lower level container upon receiving the complete indication. In some embodiments, the GTO workstation 10 of an example embodiment includes means, such as the processing circuitry 500, the processor 512, or the like, for causing an indication to an operator that a lower level container bay is empty. In some embodiments, the GTO workstation 10 of an example embodiment includes means, such as the processing circuitry 500, the processor 512, or the like, for causing the upper level container to be removed from the given upper level container bay once the one or more objects are retrieved.

It must be noted that, as used in this specification and the appended claims, the singular forms "a," "an" and "the" include plural referents unless the content clearly dictates otherwise.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A goods to operator workstation, the goods to operator workstation comprising:
an upper level, wherein the upper level comprises an upper level conveyor and one or more upper level container bays configured to receive and present one of the one or more upper level containers;
at least one connector panel extending from the upper level; and
a lower level coupled to the at least one connector panel, the lower level comprises one or more lower level container bays to receive and present one of one or more lower level containers, wherein a gap is defined between the upper level and the lower level that is sized to allow the one or more lower level containers to be placed on the lower level, and wherein a size of the one or more lower level container bays is adjustable based on a size of the one of the one or more lower level containers.

2. The goods to operator workstation of claim 1, wherein each of the one or more upper level container bays comprise an upper level bay conveyor to retrieve and provide the given upper level container to and from the upper level conveyor.

3. The goods to operator workstation of claim 2, each of the one or more upper level container bays is angled downwardly away from the upper level conveyor, such that during operation, the upper level container in the given upper level container bay is angled toward an operator.

4. The goods to operator workstation of claim 1, wherein each of the one or more lower level container bays comprise a lower level bay conveyor to provide the given lower level container to a lower level conveyor.

5. The goods to operator workstation of claim 4, each of the one or more lower level container bays is angled downwardly away from the lower level conveyor, such that during operation, the lower level container in the given lower level container bay is angled toward the operator.

6. The goods to operator workstation of claim 1, further comprising an overhead mount, wherein the overhead mount arcuately extends above the upper level.

7. The goods to operator workstation of claim 6, wherein the overhead mount comprises an integrated display configured to provide picking operation information to the operator during operation.

8. The goods to operator workstation of claim 6, wherein one overhead mount is provided for a plurality of upper level container bays within the upper level of the goods to operator workstation.

9. The goods to operator workstation of claim 6, wherein the overhead mount comprises a projection indicator configured to illuminate at least a portion of an upper level container for which the operator is to retrieve one or more objects.

10. The goods to operator workstation of claim 1, further comprising an object selection indicator configured to indicate an instance in which an object should be disposed in a given lower level container.

11. The goods to operator workstation of claim 10, wherein the object selection indicator includes an engagement mechanism configured for the operator to engage in an instance in which an object is disposed in the corresponding lower level container.

12. The goods to operator workstation of claim 10, wherein the object selection indicator includes a light configured to illuminate the given lower level container.

13. A goods to operator workstation, the goods to operator workstation comprising:
an upper level, wherein the upper level comprises an upper level conveyor and one or more upper level container bays configured to receive and present one or more upper level containers;
at least one connector panel extending from the upper level;
a lower level coupled to the at least one connector panel, the lower level configured to receive or more lower level containers, wherein a gap is defined between the upper level and lower level that is sized to allow the one or more lower level containers to be placed on the lower level; and
a first sidecar coupler defined along a first lateral side of the goods to operator workstation configured to couple the goods to operator workstation to a modular sidecar.

14. The goods to operator workstation of claim 13, wherein the modular sidecar is a second goods to operation workstation.

15. The goods to operator workstation of claim 13, wherein the modular sidecar includes an additional lower level container bay.

16. The goods to operator workstation of claim 14, wherein the modular sidecar comprises an object selection indicator configured to illuminate the given additional lower level container bay in an instance in which objects are to be disposed.

17. The goods to operator workstation of claim 13, wherein the goods to operator workstation and the modular sidecar are coupled electrically.

18. The goods to operator workstation of claim 13, wherein the goods to operator workstation and the modular sidecar are coupled mechanically.

19. The goods to operator workstation of claim 13, wherein the goods to operator workstation further comprises a second coupler defined along a second lateral side of the goods to operator workstation opposite the first lateral side.

20. A goods to operator workstation, the goods to operator workstation comprising:
an upper level, wherein the upper level comprises an upper level conveyor and one or more upper level container bays configured to receive and present one or more upper level containers;
at least one connector panel extending from the upper level;
a lower level coupled to the at least one connector panel, the lower level comprises one or more lower level container bays to receive and present one of one or more lower level containers, wherein a gap is defined between the upper level and lower level that is sized to allow the one or more lower level containers to be placed on the lower level, and wherein a size of the one or more lower level container bays is adjustable based on a size of the one of the one or more lower level containers; and
a platform configured to allow the operator to stand on during operation of the goods to operator workstation.

21. The goods to operator workstation of claim 20, wherein the platform is defined along a length direction of the lower level.

22. The goods to operator workstation of claim 20, wherein a height of the platform is based on the size of the lower level container to be used in the goods to operator workstation.

23. The goods to operator workstation of claim 20, wherein the platform is retractable or moveable.

24. A method of operating a goods to operator workstation comprising:
- identifying an upper level container disposed in one of one or more upper level container bays from which to retrieve one or more objects;
- providing an indication of the upper level container from which to retrieve the one or more objects;
- determining one or more lower level containers to dispose the one or more retrieved objects; and
- receiving a complete indication for one of the one or more lower level containers that the objects intended to be disposed in the given lower level container has been disposed,
- wherein the goods to operator workstation comprises one or more lower level container bays to receive and present one of the one or more lower level containers, and
- wherein a size of the one or more lower level container bays is adjustable based on a size of the one of the one or more lower level containers.

25. The method of claim 24, further comprising confirming a placement of the one or more objects into the correct lower level container.

26. The method of claim 24, further comprising causing the lower level container to be removed from the given lower level container upon receiving the complete indication.

27. The method of claim 25, further comprising causing an indication to an operator that a lower level container bay is empty.

28. The method of claim 24, further comprising causing the upper level container to be removed from the given upper level container bay once the one or more objects are retrieved.

* * * * *